United States Patent [19]
Ooya et al.

[11] 3,885,137
[45] May 20, 1975

[54] METHOD AND SYSTEM FOR CONSTANT-SPEED RUNNING OF VEHICLES

[75] Inventors: Junichiro Ooya; Naoji Sakakibara; Yasuhiro Kawabata; Hideo Nawa; Takashi Hida; Akira Tarao; Korehiko Tsukuba; Kazutaka Kuwana, all of Kariya, Japan

[73] Assignee: Aisin Seiki Kabushiki Kaisha, Aichi, Japan

[22] Filed: May 8, 1972

[21] Appl. No.: 184,111

[52] U.S. Cl. ............... 235/150.2; 123/102; 317/5; 324/162; 180/105 E
[51] Int. Cl. ............ B60k 31/00; G05d 13/00
[58] Field of Search............ 235/150.2, 151.32, 151, 235/92 QC, 92 DN, 92 FQ, 92 CA, 92 CT; 123/97 R, 98, 102; 180/105 R, 105 E, 109; 317/5; 324/160, 161, 162, 166; 340/52 R, 53, 54, 56, 62, 172.5; 73/507, 513, 488, 489

[56] References Cited
UNITED STATES PATENTS

| | | | |
|---|---|---|---|
| 3,455,411 | 7/1969 | Carp et al. | 180/105 |
| 3,570,622 | 2/1971 | Wisner | 180/105 |
| 3,575,256 | 4/1971 | Jania et al. | 123/102 X |
| 3,580,355 | 5/1971 | Kitano et al. | 180/105 |
| 3,599,154 | 8/1971 | Carol, Jr. et al. | 340/172.5 |
| 3,715,006 | 2/1973 | Walsh et al. | 317/5 X |

Primary Examiner—Joseph F. Ruggiero
Attorney, Agent, or Firm—Holman & Stern

[57] ABSTRACT

For constantly adjusting the speed of a motor vehicle to a speed precedingly set by the vehicle driver, an electric signal responsive to the rotation of its wheels is continuously produced and is translated into pulses of desired characteristics. These pulses are counted under the control of separately produced signals to obtain a pulse number representing the set speed of the motor vehicle and pulse numbers respectively representing its actual speed at specified instants following the moment when the driver sets the vehicle speed. From these data a pulse number is computed which substantially represents the sum of a difference between the set speed and the actual speed and a rate of change in the actual speed. The pulse number of used for re-adjustment of the actual speed of the motor vehicle to the precedingly set speed. There are also disclosed herein some digitally operating systems based on this method.

10 Claims, 24 Drawing Figures

| | ACCELERATION VALVE 11 | DECELERATION VALVE 12 | ADLCSTING VALVE 13 |
|---|---|---|---|
| WHEN THE SPEED DROPS GREATLY BELOW SET SPEED | ○ | ○ | × |
| WHEN THE SPEED DROPS SLIGHTLY BELOW SET SPEED | ○ | ○ | ○ |
| INTERMEDIATE ZONE (INSENSITIVE ZONE) | × | ○ | ○ |
| WHEN THE SPEED INCREASES SLIGHTLY ABOVE SET SPEED | × | × | ○ |
| WHEN THE SPEED INCREASES GREATLY ABOVE SET SPEED | × | × | × |

○ OPERATIVE (ENERGIZE)

× INOPERATIVE (DE-ENERGIZE)

METHOD AND SYSTEM FOR CONSTANT-SPEED RUNNING OF VEHICLES

BACKGROUND OF THE INVENTION

The present invention relates to a method and system for constant-speed running of motor vehicles. More particularly, the invention is directed to a novel computerized method and system for constantly adjusting the speed of a motor vehicle to a set speed, wherein only digital signals are used from detection of the rotation of the vehicle wheels to final control of the means for regulating the opening of an engine throttle valve.

In the various methods and systems used heretofore for constant-speed running of vehicles and provided with electrical circuits, the computers for judging the state of rotation of the wheels have comprised principally analog or semi-digital circuits. For this reason, it has been the common practice to resort to a method which comprises detecting the state of at least one wheel as a pulse signal (digital signal) by means of a sensor, smoothing this digital signal and converting it into an analog signal, processing this analog signal in a computer, and applying the output signal of the computer to an actuator for controlling the vehicle speed.

In the practice of such a method, the use of analog circuits is disadvantageous in that, since the variations in the characteristics of the circuit components affect the performance of the computer, a temperature compensation circuit as a countermeasure for temperature drift due to the temperature dependency of the circuit components, a circuit for converting digital signals into analog signals, and a voltage-regulating circuit of high precision are necessary.

Furthermore, since the characteristics of the components used change with the passage of time, the computer performance is adversely affected. Another difficulty is that computer performances differ from computer to computer because of deviations in the characteristics of the components produced, whereby this method is unsuitable for quantity (mass) production of computers of uniform quality and performance.

It is well known that the use of integrated circuits affords miniaturization of the circuitry, great economy, and great improvement in operational reliability. However, the adaptation of integrated circuits to analog circuits entails several difficulties such as the necessity of combining inductances and capacitors of high capacitance in the circuit and, therefore, is not practically feasible.

Furthermore, the allowable deviations of passive components such as resistances and capacitors constituting the circuit must be specified with considerably greater strictness than in the case of adaption of digital integrated circuits. Still another difficulty is the necessity of using expensive capacitors of low leakage current for the purpose of effecting memory storage of voltage corresponding to set speed in the method and apparatus for constant-speed running.

SUMMARY OF THE INVENTION

It is an object of the present invention to provide a new and better method and system for constant-speed running of vehicles, which are well calculated to overcome the listed disadvantages of the prior art.

Another object of the invention is to provide a method of the character referred to, wherein a signal for actuation of operation controller means of an engine throttle valve is obtained by digital superposition of a difference between a precedingly set speed and the present speed of a motor vehicle and a rate of acceleration or deceleration of the present speed, so that the vehicle speed is always kept faithfully close to the set speed.

In accordance with this improved method, there is further provided, as an important object of the present invention, a practical system for constant-speed running of vehicles which operates with a less number of components than its predecessors, which can be easily mass-produced in the form of highly integrated circuits, and which permits ready modifications to fit particular needs.

A further object of the invention is to provide a system of the character referred to, wherein a digital signal produced from means for detecting the speed of a motor vehicle need not be turned into an analog signal, so that the various deficiencies and inconveniences arising from the use of analog circuits in its conventional counterparts are successfully eliminated.

A further object of the invention is to provide a system of the character referred to, wherein addition and subtraction of pulses representative of the speed of a motor vehicle may be carried out simultaneously in a single counting circuit in order to shorten the cycle for production of a desired operation signal.

A further object of the invention is to provide a system of the character referred to, wherein the lengths of time for addition and subtraction of the pulses required for ascertaining a rate of acceleration or deceleration of the vehicle speed can be easily made adjustable to provide an optimum operation signal depending upon the requirements and operating conditions of each motor vehicle.

A further object of the invention is to provide a system of the character referred to, wherein the frequency of an oscillator included in its control circuit is manually variable to make more or less slight re-adjustment of a precedingly set vehicle speed, so that the driver can keep himself at a safe distance from a vehicle running ahead even while he is cruising at the set speed.

Still a further object of the invention is to provide a system of the character referred to, wherein an operation controller incorporating three valves for acceleration, deceleration, and fine adjustment of the vehicle speed is provided which, under the control of the digitally operating system of this invention, efficiently regulates the opening of an engine throttle valve.

According to this invention, briefly summarized, there is provided a method of constantly adjusting the speed of a motor vehicle to a set speed, which comprises sensing the rotational state of the wheels of the motor vehicle to provide an electric signal representative of its speed, translating this electric signal into pulses of desired characteristics, counting the pulses as dictated by control signals to obtain a pulse number representing a precedingly set speed of the motor vehicle and pulse numbers respectively representing its actual speed at specified instants, the mentioned control pulses being produced from clock pulses of a predetermined frequency, further computing a pulse number which substantially represents the sum of a difference between the set speed and the actual speed of the motor vehicle and a rate of change (i.e., acceleration or deceleration) in the actual speed, and adjusting the speed of the motor vehicle to the set speed according to that pulse number representing the sum.

By way of an example of practical application of this method of the invention, there is further disclosed herein a system for constant-speed running of vehicles, which comprises means for sensing the rotational state of the wheels of a motor vehicle, a shaping circuit for translating an output signal from the sensing means into pulses of desired characteristics, a control circuit for producing control signals from clock pulses of a predetermined frequency, manually operable means for setting a speed at which the motor vehicle is desired to run constantly, a counting circuit for counting the output pulses from the shaping circuit as dictated by the control signals to obtain a pulse number in binary notation which represents a precedingly set speed of the motor vehicle and pulse numbers respectively representing its actual speed at specified instants and for further counting a pulse number in binary notation which substantially represents the sum of a difference between the set speed and the actual speed of the motor vehicle and a rate of change in its actual speed, a decision circuit for deciding an operation required on the basis of the final pulse number obtained in the counting circuit, and operation controller means for adjusting the speed of the motor vehicle to the set speed according to an output signal from the decision circuit.

The above stated and various other objects, as well as nature, principles, and utility of the present invention will be more clearly apparent from the following description taken in connection with the accompanying drawings showings preferred embodiments of the invention.

BRIEF DESCRIPTION OF THE DRAWINGS

In the drawings:

FIG. 12 is a tabular diagram indicating relationships between the register output signal of the counting circuit and the operation signal of the decision decoder with respect to the number E of counted pulses;

FIG. 18 is a tabular chart indicating the operational states of the electromagnetic valve for acceleration, the electromagnetic valve for deceleration, and the valve for throttling under various conditions;

DETAILED DESCRIPTION

Figure 1:
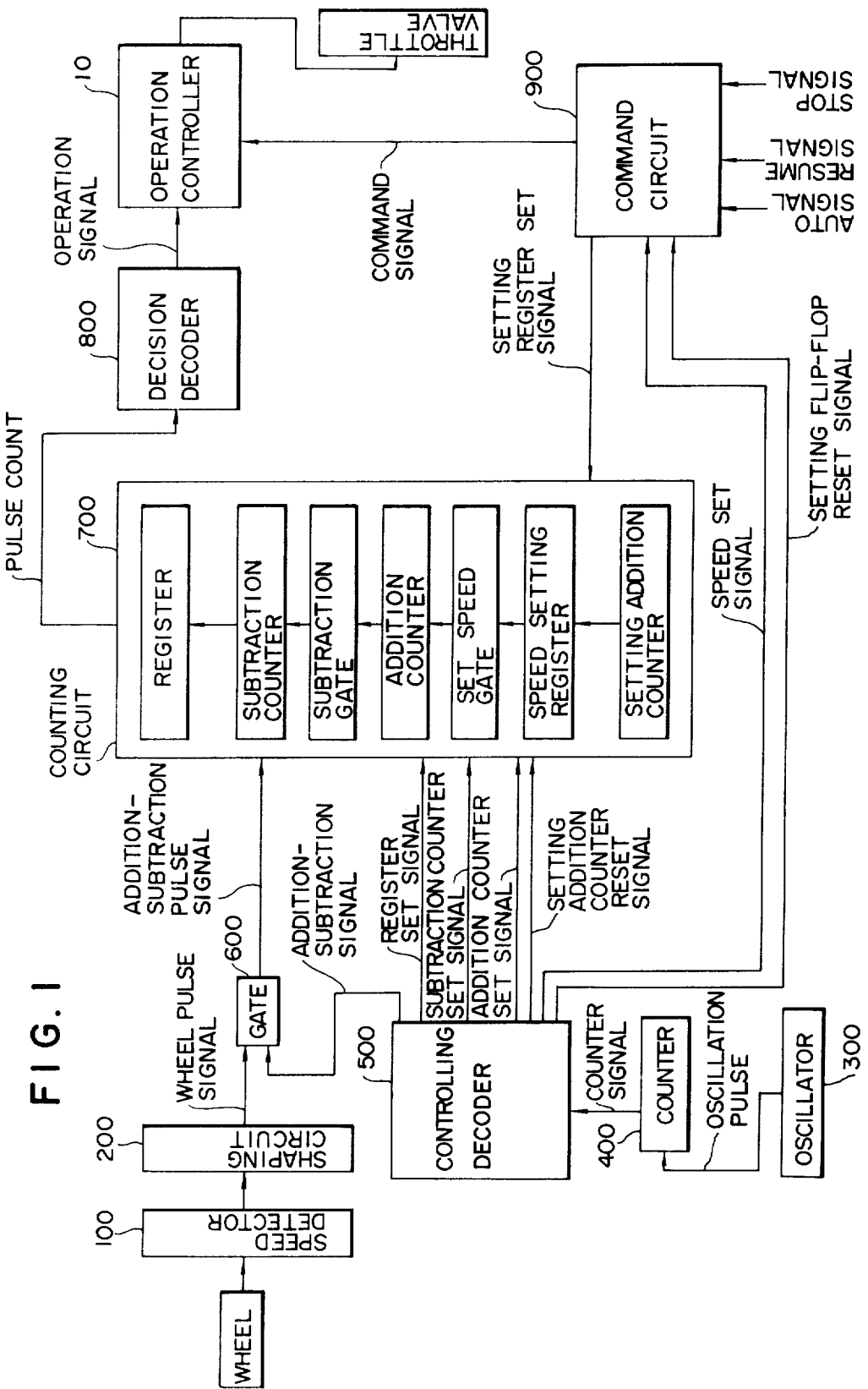
FIG. 1 is a block diagram indicating the essential organization of one specific example of embodiment of this invention.

Referring first to FIG. 1 showing the general organization of elements constituting an example of the system of the invention, the input side of the system is provided with a speed detector 100 comprising components such as known sensors and operating to detect the rotational state of a wheel as it rolls along the ground and to generate a corresponding detection signal. This detection signal is amplified and wave-shaped by a shaping circuit 200 to become a wheel pulse signal.

On one hand, an oscillator (oscillator circuit) 300 generates oscillation pulses of a specific frequency. These pulses are counted by a counter 400 comprising a free-running counter, which thereby sends a counter signal to a controlling decoder 500.

The controlling decoder 500 is adapted to decode the counter signal and accordingly and periodically transmit an addition-subtraction signal, a register set signal, subtraction counter set signal, an addition counter set signal, a setting addition counter reset signal, speed set signal, and setting flip-flop reset signal. The addition-subtraction signal is sent to a gate circuit 600, which operates in accordance therewith to open and close the above mentioned wheel pulse signal and thereby to transmit an addition-subtraction pulse signal.

The above mentioned speed set signal and the setting flip-flop signal are sent to a command circuit 900. This command circuit 900 operates to decode: (1) an "auto" signal operationally transmitted when the vehicle driver or operator sets a specific set speed and wishes to place an operation controller 10 in operative state; (2) "stop" signal operationally transmitted when the driver wishes to stop the operation of the operation controller 10; (3) a "resume" signal operationally transmitted when the driver wishes to place only the operation controller 10 in operative state without changing the speed set in the preceding cycle; and (4) the above mentioned speed set signal and (5) the setting flip-flop reset signal from the controlling decoder 500 and thereby to send out a command signal for activating or stopping the operation of the operation controller 10 and a setting register set signal for setting the set speed.

The above mentioned addition-subtraction pulse signal, register set signal, subtraction counter set signal, addition counter set signal, and setting register set signal are introduced into a counting circuit 700 comprising a setting addition counter, a speed setting register, a set speed gate, an addition counter, a subtraction gate, a subtraction counter, and a register.

The setting addition counter counts the addition-subtraction pulse signal after being reset by the setting addition counter reset signal. Upon completion of this counting, the command circuit 900 receives the speed set signal and transmits the setting register set signal in the case where the driver is sending an auto signal. Accordingly, the result of the above mentioned counting of the setting addition counter is set in the speed setting register, and pulses corresponding to the set speed are stored.

When the driver cuts off the auto signal, the command circuit 900 receives the speed set signal only once again after the auto signal is thus cut off and transmits a setting register set signal, but thereafter the generation of the setting register set signal is stopped by the setting flip-flop reset signal. The set speed gate is opened by the addition counter set signal, and the number of pulses recorded in the speed setting register is set in the addition counter.

Next, the addition counter counts the addition-subtraction pulse signal. Upon completion of this counting, the subtraction gate is opened by the subtraction counter set signal, and the number of pulses counted by the addition counter is set in the subtraction counter.

Next, the subtraction counter counts the addition-subtraction pulse signal. Upon completion of this counting, the register is caused by the register set signal to record the number of pulses counted by the subtraction counter. Then this recorded number of pulses is decoded by a decision decoder 800, which accordingly sends a specific operation signal to the operation controller 10. As a result, the operation controller 10 operates in accordance with the command signal and the operation signal to open or close the throttle valve of the vehicle engine thereby to increase or decrease the vehicle speed.

The operation of the system of the general simplified organization indicated in FIG. 1 will now be described. The so-called oscillation pulses generated by the oscillator 300 are counted by the counter 400. If it is assumed that this counter 400 comprises 6 flip-flops, for example, it will count $2^6 - 64$, that is, from 0 to 63, and will repeat this counting operation, periodically sending a counter signal to the controlling decoder 500.

The controlling decoder 500 receives the periodic counter signal from the counter 400 and accordingly transmits the various signals thereafter, that is, the setting addition counter reset signal, the addition-subtraction signal, the speed set signal (setting register set signal), the setting flip-flop reset signal, the addition counter set signal, the addition-subtraction signal, the subtraction counter set signal, the addition-subtraction signal, and the register set signal.

Figure 5:
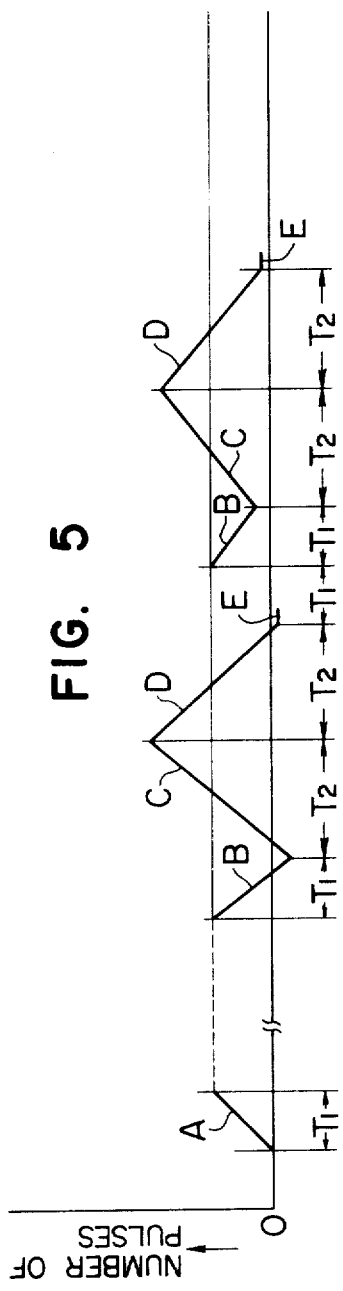
FIGS. 5, 6, 7, and 8 are graphical representations indicating methods of pulse operation.

The transmission of the setting addition counter reset signal causes the setting addition counter to be set at zero, and then, when the addition-subtraction signal opens the gate circuit 600 for a specific time $T_1$, the wheel pulse signal obtained from the wheel rotational state through the speed detector 100 and shaping circuit 200 passes through the gate circuit 600 to become an addition-subtraction pulse signal, which is counted by the setting addition counter, a pulse number A (set speed) corresponding to the speed being counted as indicated in FIG. 5.

When the driver is operationally transmitting an auto signal, the speed set signal passes through command circuit 900 to become a setting register set signal, and the pulse number A is recorded in the speed setting register. When the driver is not transmitting an auto signal, the speed set signal is cut off by the command circuit 900, and the setting register set signal is not generated, the number of pulses counted by the setting addition counter not being recorded in the speed setting register.

The setting flip-flop reset signal nullifies the speed set signal from the succeeding cycle. The addition counter set signal and the subtraction counter set signal are transmitted for the purpose of opening the set speed gate (addition gate) and the subtraction gate. The register set signal records the number of counted pulses (represented by E in FIG. 5) in the register. Thus, the controlling decoder 500 periodically transmits the various above described signals.

As indicated in FIG. 5, the pulse number A corresponding to the set speed is set in the subtraction counter, and the gate circuit 600 is opened by an addition-subtraction signal of a time width $T_1$, the addition-subtraction pulse signal thus passed being counted by the subtraction counter. When a pulse number B corresponding to the present speed is subtracted, a number of pulses $(A - B)$ corresponding to the difference between the set speed and the present speed is obtained in the subtraction counter.

If the operation wherein the degree of opening of the throttle valve is increased when this pulse number $(A - B)$ is positive, that is, when $A \geq B$, and the throttle valve is closed when this number $(A - B)$ is negative, that is, when $A < B$ is resorted to, the operation will become a so-called ON, OFF control, which will be rough.

Accordingly, the procedure resorted to comprises further setting the pulse number $(A - B)$ in the addition counter, counting an addition-subtraction pulse signal of a time width $T_2$ (which, while it may be the same as the aforementioned time width $T_1$, is not made equal to $T_1$ in the instant example for reason of convenience) in the addition counter, adding a pulse number C corresponding to the present speed to determine the pulse number $(A-B+C)$ in the addition counter, then setting the pulse number $(A-B+C)$ in the subtraction counter, counting the addition-subtraction pulse signal of time width $T_2$ in the subtraction counter, subtracting a pulse number D corresponding to the present speed, and determining the pulse number $(A-B+C-D)$ in the subtraction counter.

As is apparent from FIG. 5, the pulse number $(C - D)$ is a number of pulses corresponding to acceleration and deceleration, that is, increase and decrease of the present speed. Accordingly, when $A-B+C-D = E$ is considered, the counted number of pulses E is the sum of the pulse number correspondng to the difference of the set speed and present speed and the pulse number corresponding to the acceleration or deceleration, that is, increase or decrease of the present speed.

Thus, a unique feature of this invention is that, without the use of complicated and expensive adders, the number of pulses E is counted by superposition of the sum of the pulse number corresponding to the difference between the set speed and the present speed and the pulse number corresponding to the increase or decrease in the present speed, i.e., acceleration or deceleration.

If, as indicated in FIG. 5, the pulse number E is counted in the sequence of A, B, C, and D, at least four operations, namely, addition, subtraction, addition, and subtraction will be necessary.

Figure 6:
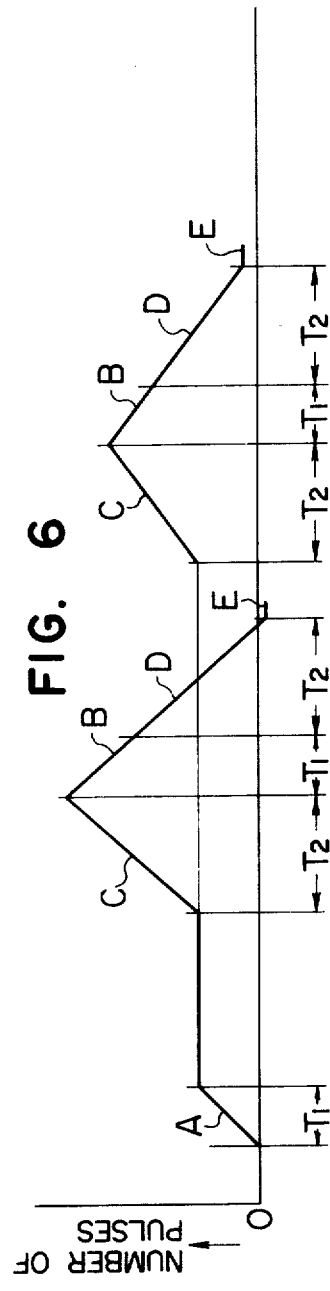

Accordingly, it is also possible to count the pulse number E in the sequence of A+C−B−D as indicated in FIG. 6 and thereby to simplify the counting operation. That is, the pulse number A corresponding to the set speed recorded in the speed setting register is set in the addition counter since the set speed gate is opened by the addition counter set signal. Then the number of pulses is counted by an addition-subtraction pulse signal of time width $T_2$.

The number of pulses (A + C) obtained in the addition counter is set in the subtraction counter through the subtraction gate by the subtraction counter set signal. The subtraction counter counts an addition-subtraction pulse signal of time width ($T_1 + T_2$) and subtracts pulse number (B + D), whereby the counted pulse number (A+C−B−D) is determined in the subtraction counter.

Figure 7:
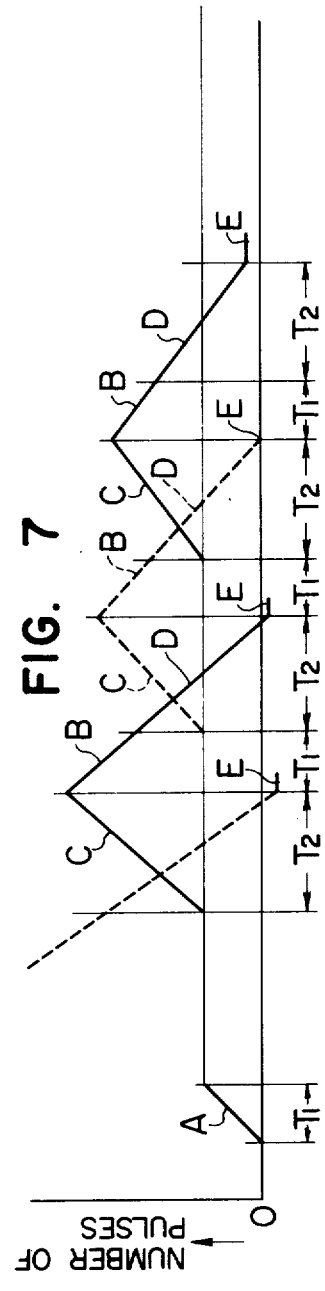

By the counting method indicated in FIGS. 5 and 6, the subtraction counter is inoperative during the counting operation of the addition counter, while the addition counter is at rest when the subtraction counter is counting. However, it is also possible to cause both the addition counter and the subtraction counter to count simultaneously as indicated in FIG. 7. More specifically, while the subtraction counter is counting, the addition counter begins to count the pulse number E of the succeeding cycle.

By this simultaneous operational method, the period for generating the operation signal becomes short, and it necessary merely to transmit an addition-subtraction pulse signal of a time width $T_1$ or $T_2$ simultaneously to the addition counter and the subtraction counter. Therefore, the control signals transmitted from the controlling decoder 500 become less, and the circuit design of the controlling decoder 500 becomes simple.

Figure 8:
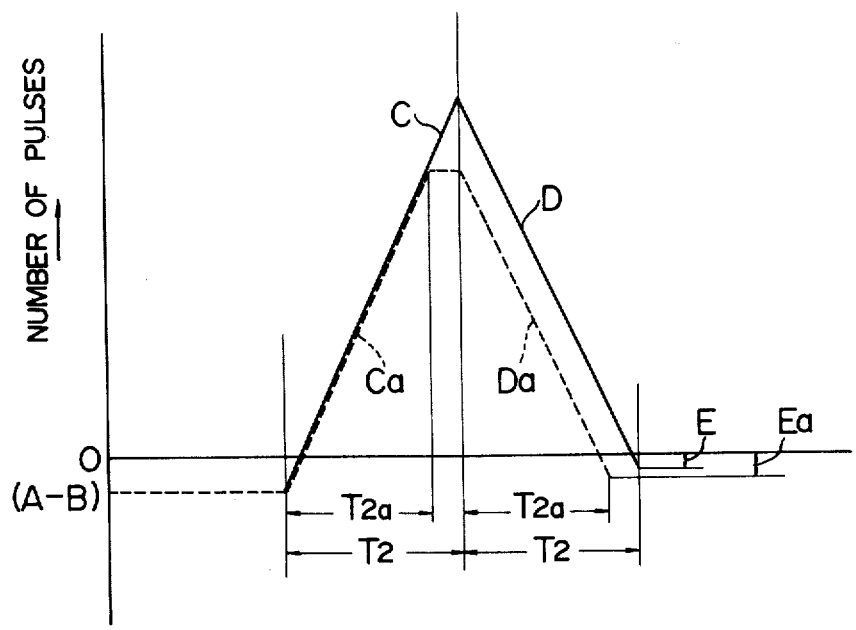

In the counting of the pulse number (C − D) corresponding to the increase or decrease (acceleration or deceleration) of the present speed as indicated in FIG. 8, it is also possible to adjust the time width $T_2$ of the addition-subtraction pulse signal by adding a manually operated member which the driver can operate to the controlling decoder 500. When, under the same running conditions, the counting circuit 700 is operated with time widths $T_1$ and $T_2$, the counted pulse number E = A−B+C−D is determined, while, when the counting circuit is operated with time widths $T_1$ and $T_{2a}$, counted pulse number $E_a = A-B+C_a-D_a$ is determined.

Even for the same variation in the degree of opening of the throttle, the increase or decrease in the present speed differs because of factors such as the gross weight of the vehicle, the engine power, and the time constant of the controls. Accordingly, the pulse number (C − D) corresponding to the increase or decrease of the present speed is adjusted by varying the time width $T_2$ so that the optimum pulse number E is obtained.

Figures 9A, 9B:
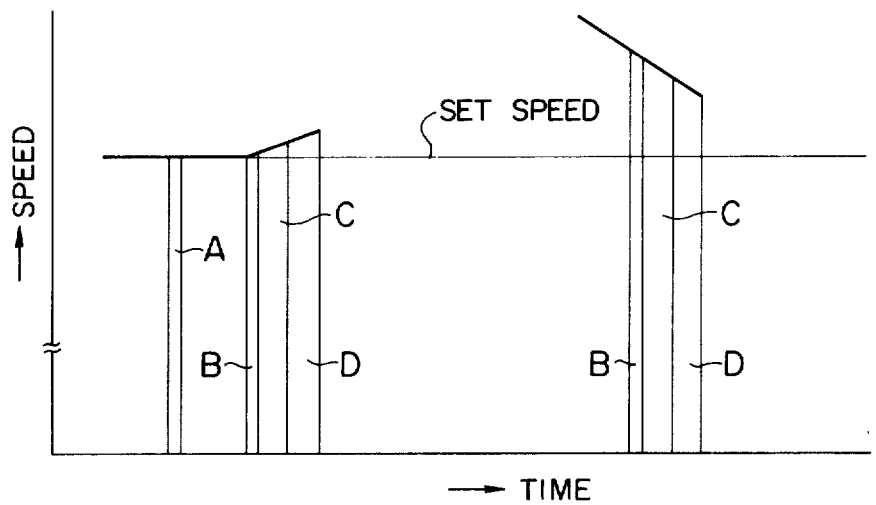
FIG. 9 comprises graphical representations indicating relationships between time and vehicle speed when a difference occurs between the vehicle speed and a set speed.

When, during running of the vehicle at constant speed, the vehicle speed becomes higher than the set speed because the vehicle has moved onto a declining or downhill stretch of road, for example, the pulse number (A − B) corresponding to the difference between the set speed and the present speed and the pulse number (C − D) corresponding to the increase in the present speed (acceleration) both become negative. Consequently, the pulse number E becomes negative as indicated in FIG. 9(a). As a result, the degree of opening of the throttle valve is decreased, and the vehicle speed decreases.

Then, as the vehicle speed thus decreases and approaches the set speed, the pulse number (A − B) corresponding to the difference between the set speed and the present speed becomes negative, while the pulse number (C − D) corresponding to the decrease of the present speed (deceleration) becomes positive. Therefore, since the pulse number E becomes positive when the present speed is higher by a certain value than the set speed, the degree of throttle valve opening begins to increase as indicated in FIG. 9(b).

Figures 9C, 9D:
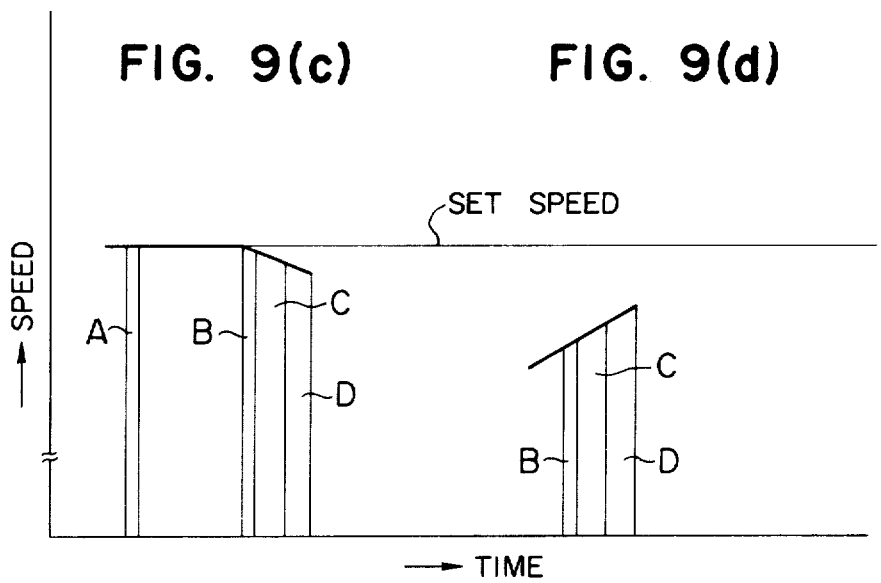

When, during constant-speed running of the vehicle, the vehicle speed becomes lower than the set speed because the vehicle has moved onto an inclining or uphill stretch of road, for example, the pulse number (A − B) corresponding to the difference between the set speed and the present speed and the pulse number (C − D) corresponding to the decrease in the speed (deceleration) becomes positive. Accordingly, the pulse number E becomes positive, as indicated in FIG. 9(c), and the degree of opening of the throttle valve increases to accelerate the vehicle.

Then, as the vehicle speed approaches the set speed, the pulse number (A − B) corresponding to the difference between the set speed and the present speed becomes positive, while the pulse number (C − D) corresponding to the increase in the present speed (acceleration) becomes negative. Therefore, since the pulse number E becomes negative when the present speed is higher by a certain value than the speed, the degree of throttle valve opening begins to decrease as indicated in FIG. 9(d).

While the pulse number E is counted so that E = A−B+C−D is valid in the example described above, an equivalent effect can be attained, of course, when the pulse number E is counted so that sequence of addition and subtraction is reversed, and E = −A+B−C+D, by a suitable circuit arrangement of the decision decoder 800.

Figure 10:
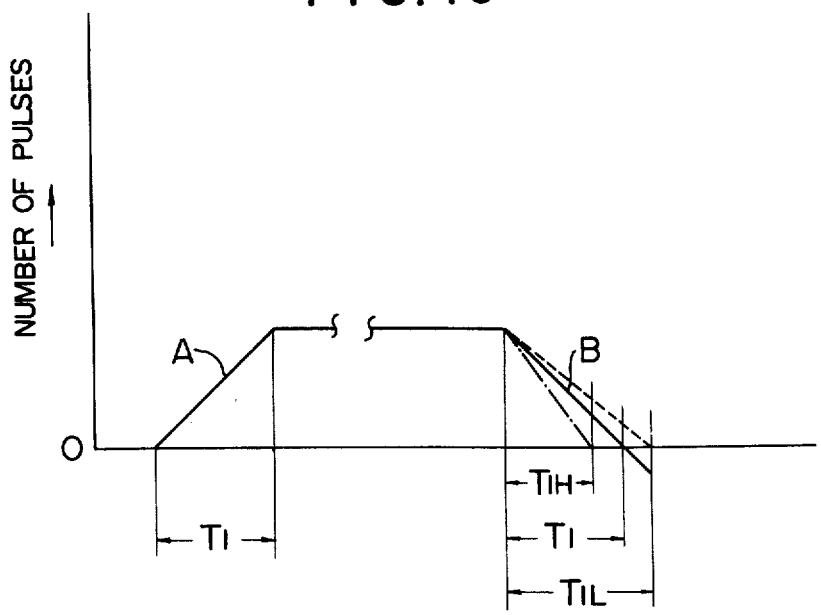
FIG. 10 is a graphical representation for a description of the operation in cases where fine adjustments are made in the set vehicle speed.

As mentioned hereinbefore, by finely adjusting the frequency of the oscillation pulse of the oscillator 300 after the pulse number A corresponding to the set speed has been recorded in the speed setting register, it is possible to attain fine adjustment of the period of the counter signal of the counter 400 and also to attain fine adjustment of the set speed without a change of setting by the auto signal of the pulse number A recorded in the speed setting register, the time width $T_1$ of the addition-subtraction signal of the controlling decoder 500 being finely adjusted as indicated in FIG. 10. This operation is resorted to when the set speed is to be changed without carrying out the procedure wherein the driver, after operating the accelerator or brake and newly adjusting the setting to a desired speed, sends out an auto signal to effect change of the set speed.

When the present vehicle speed neither increase nor decreases, and when the present speed is equal to the set speed, the pulse number B counted with the addition-subtraction pulse signal of the time duration $T_1$ may be subtracted from the pulse number A counted with the addition-subtraction pulse signal of the time duration $T_1$, the pulse number A corresponding to the set speed. Then $E = A - B = O$. The engine throttle opening in this instance is unvaried, so that the present speed is kept equal to the set speed.

By counting the pulse number corresponding to the present speed with an addition-subtraction pulse signal of a time duration $T_{1L}$, where $T_{1L}>T_1$, when the present speed is equal to the set speed, the pulse number is, as indicated in FIG. 10: $E = A - B < O$. Consequently, the throttle opening decreases, and the present speed is kept lower than the set speed until a predetermined value is attained where the pulse number E becomes zero. On the other hand, if the pulse number corresponding to the present speed is counted with an addition-subtraction pulse signal of a time duration $T_{1H}$ ($T_{1H}<T_1$) when the present speed is equal to the set speed, then, also as is obvious from FIG. 10, $E = A - B > O$. The throttle opening is then increased, and the present speed is kept higher than the set speed until a predetermined value is attained where the pulse number E becomes zero.

Figure 3:
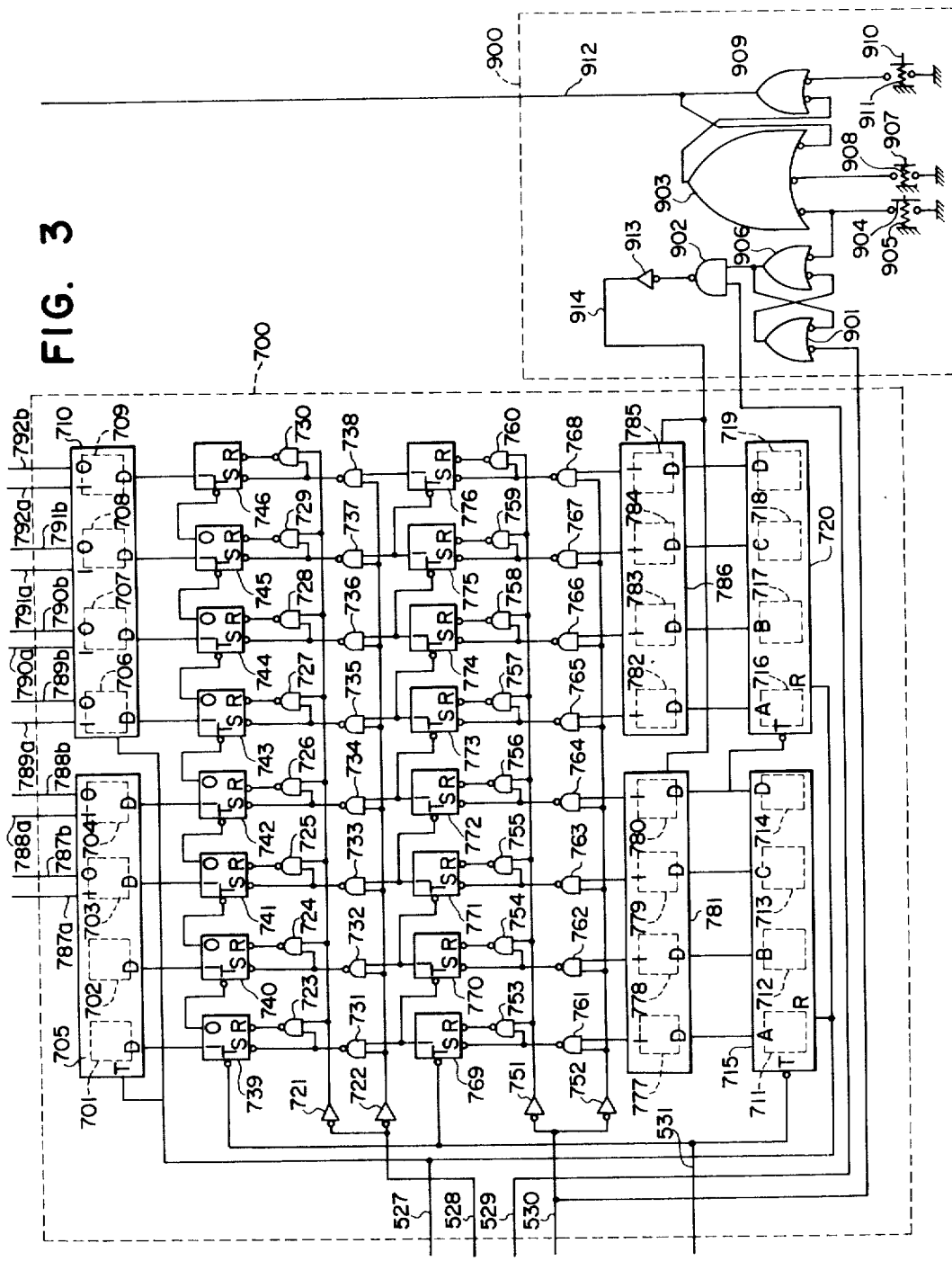
FIG. 3 is a circuit diagram showing further constitutional details of the counting circuit and the command circuit of the system shown in FIG. 1.

If, in setting the pulse number A corresponding to the set speed in the speed setting register, an auto signal is produced when the vihicle driver or operator wishes to set the vehicle speed, the speed set signal of the controlling decoder 500 passes through the command circuit 900 of FIGS. 1 and 3 to become a register set signal, and the pulse number A of the setting addition counter is stored in the speed setting register. Upon termination of the auto signal, the command circuit 900 cuts short the speed set signal by the setting flip-flop reset signal of the controlling decoder 500 supplied immediately following the speed set signal. Thereafter, the command circuit 900 does not generate a register set signal until production of the next auto signal, so that the precedingly set vehicle speed is maintained.

Figure 11:
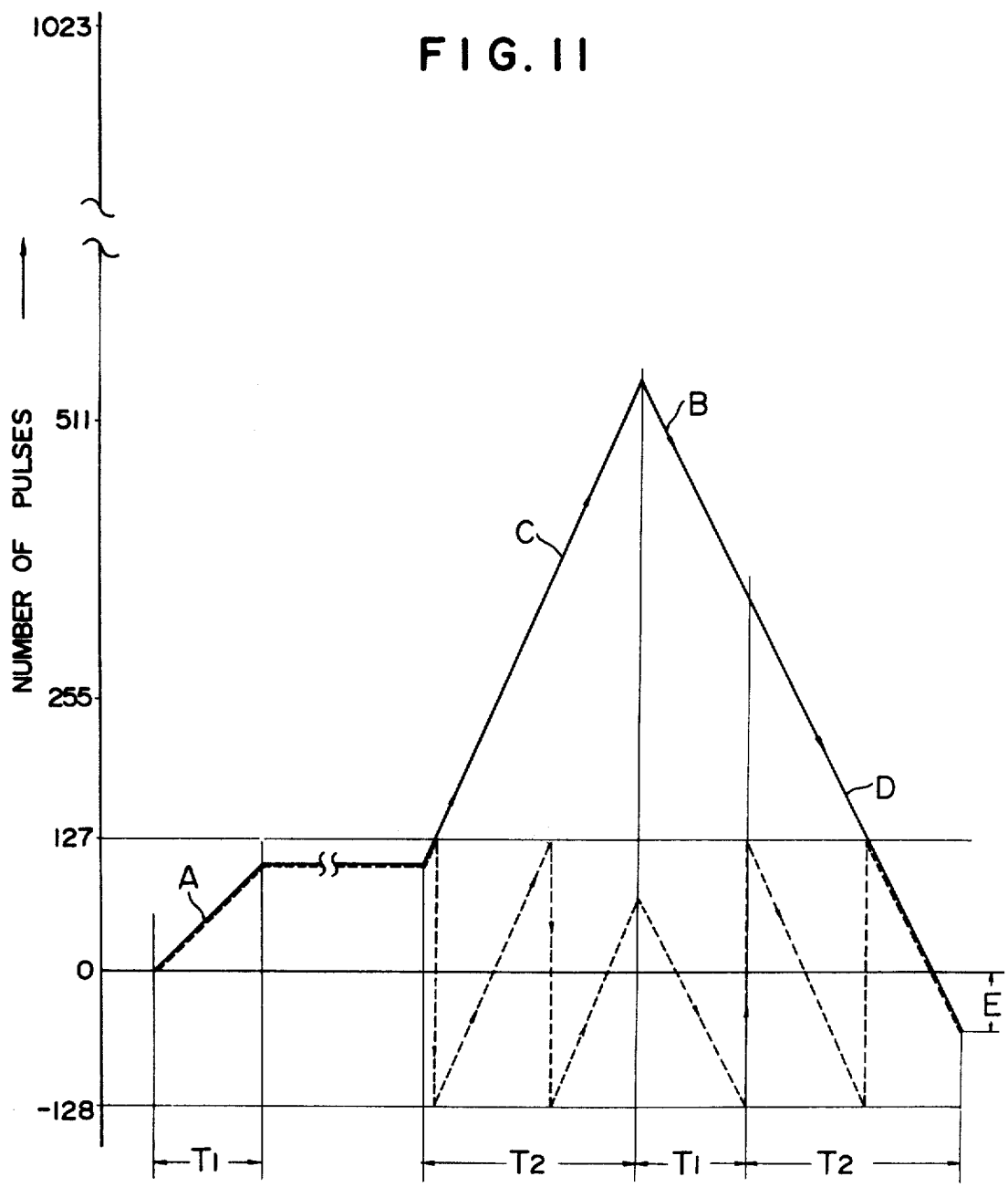
FIG. 11 is a graphical representation for a description of a rational mode of utilizing the counter used in the system of this invention.

For counting the pulse number E in the sequence, A + C − B − D, with the counting circuit 700 of FIGS. 1 and 3, or, more specifically, for counting the pulse number (A + C) or (B + D) as indicated by the solid lines in the graph of FIG. 11, an addition or subtraction counter of suitably large capacity may be usually required. However, the pulse numbers C and D are started counting substantially simultaneously and are counted with the same time duration $T_2$, so that the pulse number (C − D) is small, while the pulse number (A − B) is not greater than the pulse number A. Accordingly, the pulse number E as counted according to the formula, $E = A - C - B - D$, is only slightly more, or less, than the pulse number A. As may be understood from the dotted lines in FIG. 11, therefore, an addition or subtraction counter will suffice which is capable of counting values only the slightly more than the maximum value of the pulse number A corresponding to the set speed. By taking advantage of its periodicity, the pulse number E is thus computable with a counter of conveniently small capacity. (In the graph of FIG. 11, parts of the solid and real lines are intentionally shown side by side although they both represent the same pulse numbers in such parts.)

In the use of such small-capacity counter, output from its flip-flop which represents the most significant digit is used to indicate a positive or negative sign. It will also be understood that, in this manner, the other components of the counting circuit 700, such as the registers and gates, can be suitable decreased.

Figure 4:
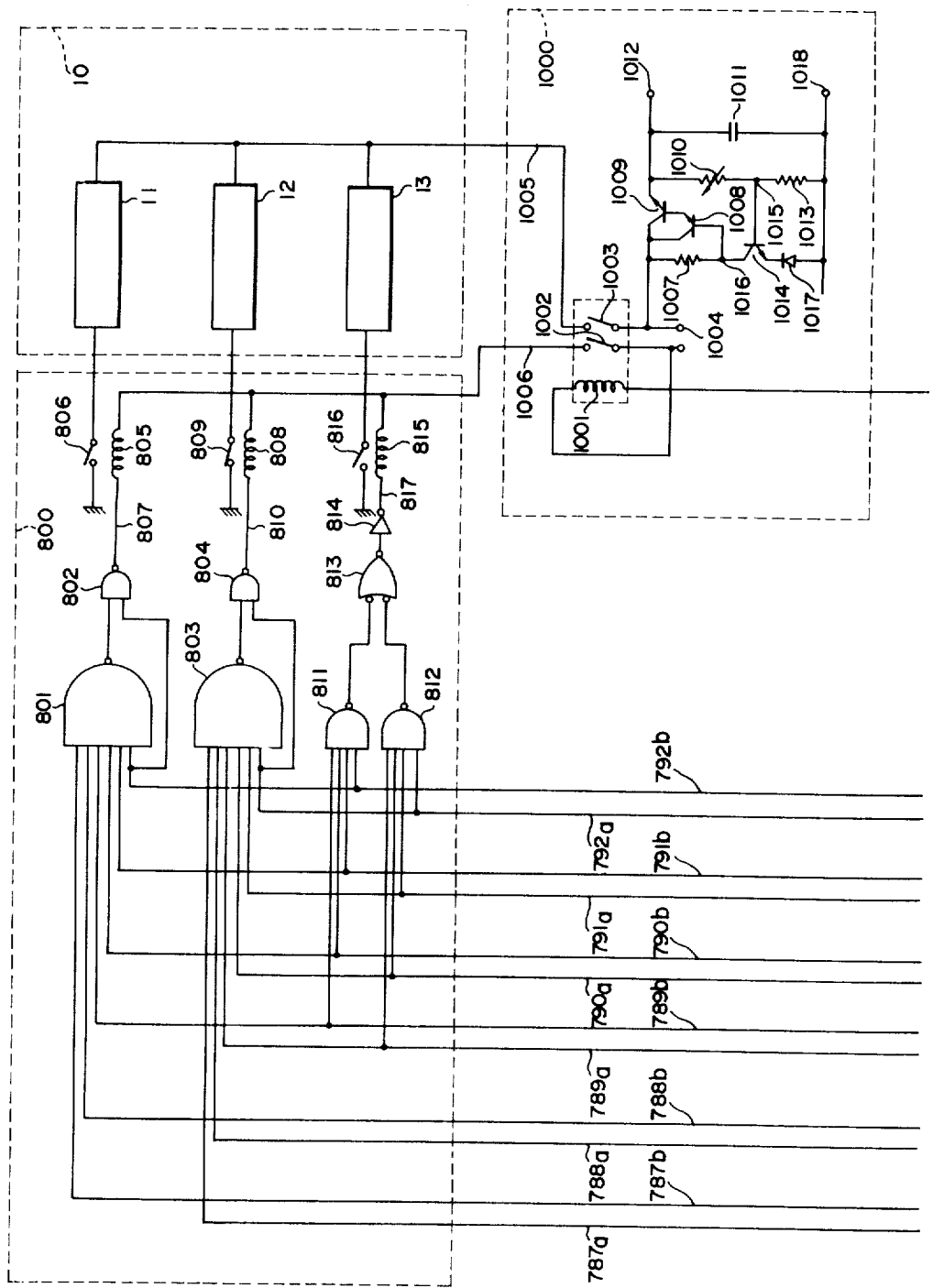
FIG. 4 is a circuit diagram showing further constitutional details of the decision decoder of the system illustrated in FIG. 1.

The operation controller 10, FIGS. 1 and 4, varies the throttle opening in accordance with a signal from the decision decoder 800 as long as a command signal from the command circuit 900 is on. When the command signal is off, or when the supply of electricity has been interrupted, the operation controller 10 decreases the throttle opening regardless of the signal from the decision decoder 800. However, due to the provision of one-way clutch between the operation controller 10 and the throttle valve, the throttle opening may be suitably regulated by means of the accelerator pedal, not shown, while the operation controller is operating to decrease the throttle opening.

Figure 12:
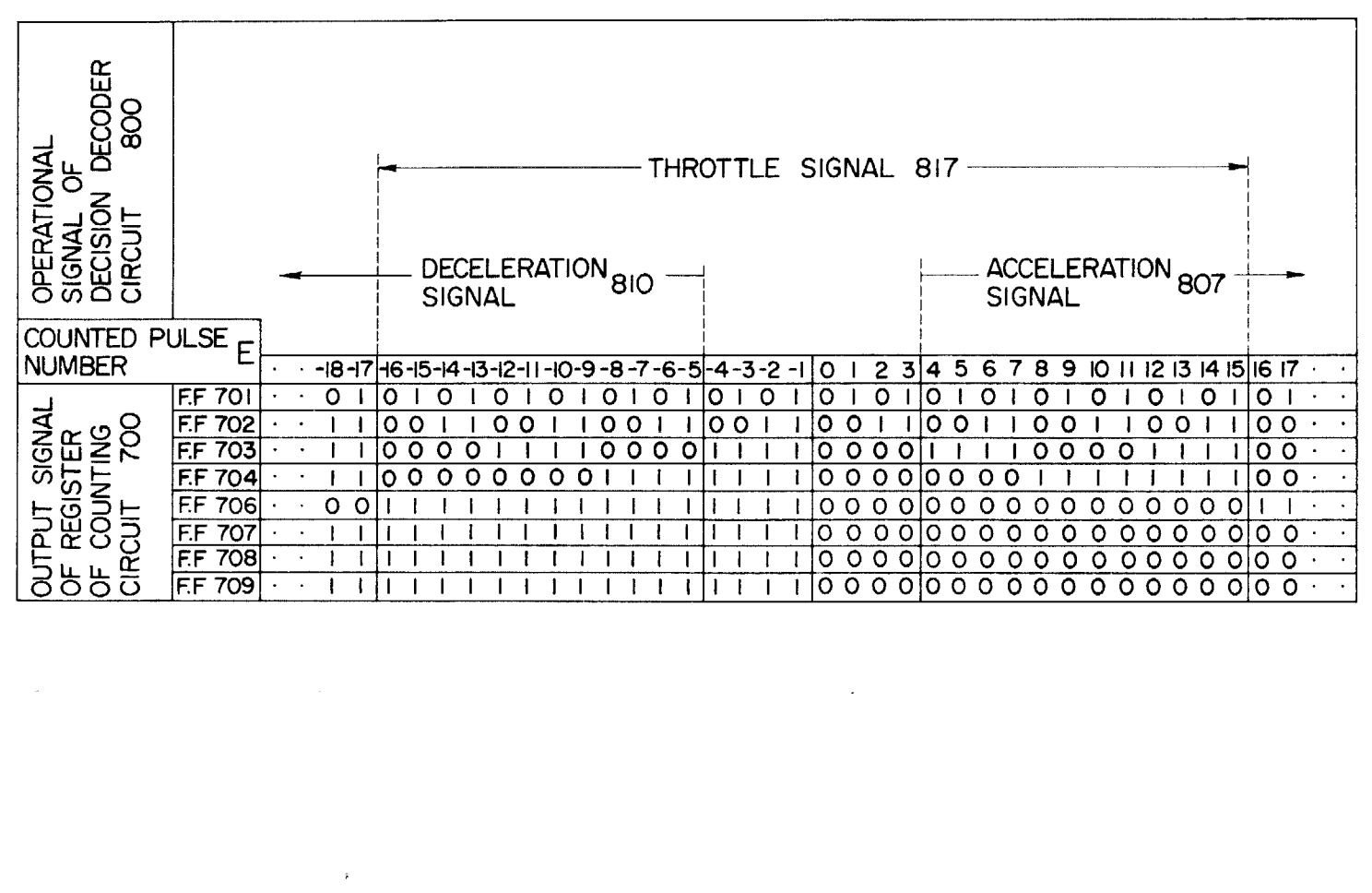

As seen in FIG. 12, the operation controller 10 starts increasing the throttle opening by an acceleration signal supplied via the decision decoder 800 when the pulse number E counted by the counting circuit 700 is equal to, or greater than, +4, for example, and starts decreasing the throttle opening by a deceleration signal supplied via the decision decoder 800 when the pulse number E is equal to, or greater than, −5. When $-4 \leq E \leq +3$, the decision decoder 800 produces neither the acceleration nor the deceleration signal, so that the throttle opening is kept unvaried. Further, when $-16 \leq E \leq +15$, the operation controller reduces the rate of increase or decrease of the throttle opening by an adjusting signal supplied via the decision decoder 800. Thanks to the foregoing operative features of the operation controller 10, the present vehicle speed is quickly brought closer to the set speed when there is agreat difference therebetween. As the present speed becomes suitably close to the set speed, the former is further slowly brought closer to the latter. The throttle opening is no longer varied when the present speed approximates the set speed.

The present embodiment of the invention will now be described in greater detail with reference to FIGS. 2 to 4. The aforementioned speed detector 100 is comprised of a shaft 101 such as a rear axle shaft or propeller shaft which is rotated with the vehicle wheels, a rotor member 103 fixedly mounted on the shaft 101 and having a number of teeth 102 on its periphery, a coil 104 which produces an alternating current having a frequency in proportion with the revolutions per unit length of time of the rotor member 103, and a permanent magnet, not shown. Terminals 105 and 106 of the coil 104 are connected to terminals 202 and 203 of a capacitor 201 in the waveform shaping circuit 200 through conductors 107 and 108, respectively. Another capacitor 204 has its input connected to the aforesaid terminal 202, while its output is connected to resistances 205 and 206 and further to the base terminal of a transistor 207. The collector terminal of this transistor 207 is connected to a power supply terminal 209 through a resistor 208 and also to the input of a capacitor 210. The emitter terminal of the same transistor 207 is connected to a grounding terminal 213 through a resistance 211 and through a capacitor 212. The output of the capacitor 210 is connected to resistances 214 and 215 and further to the base terminal of a transistor 216, the resistances 214 and 215 being connected to the power supply terminal 209 and the grounding terminal 213, respectively. The collector terminal of the transistor 216 is connected to the power supply terminal 209 through a resistor 217 and also to a resistance 218, while the emitter terminal of the same transistor is connected to the grounding terminal 213. The resistance 218 is connected to both a resistance 219 and a NAND element 220. Another NAND element 221 connected in series with the mentioned NAND element 220 has its output connected to the resistance 219, on the one hand, and to one of the inputs of a NAND element 601 of the gate circuit 600 through a conductor 222, on the other hand. Hence the aforementioned wheel pulse signal is supplied to this NAND element 601 of the gate circuit.

Proceeding now to the description of the operation of the waveform shaping circuit 200 constructed substantially as in the foregoing, there is produced an AC voltage in the coil 104 in accordance with the revolution of the vehicle wheels, not shown. This voltage is fed through the capacitor 204 to the transistor 207, where it is amplified. The amplified signal is further fed through the capacitor 210 to the transistor 216, where it is again amplified. The signal, passing through the resistance 218, has its waveform suitably shaped in the NAND elements 220 and 221 so as to be supplied into the NAND element 601 of the gate circuit 600 in the form of the desired wheel pulse signal.

Figure 2:
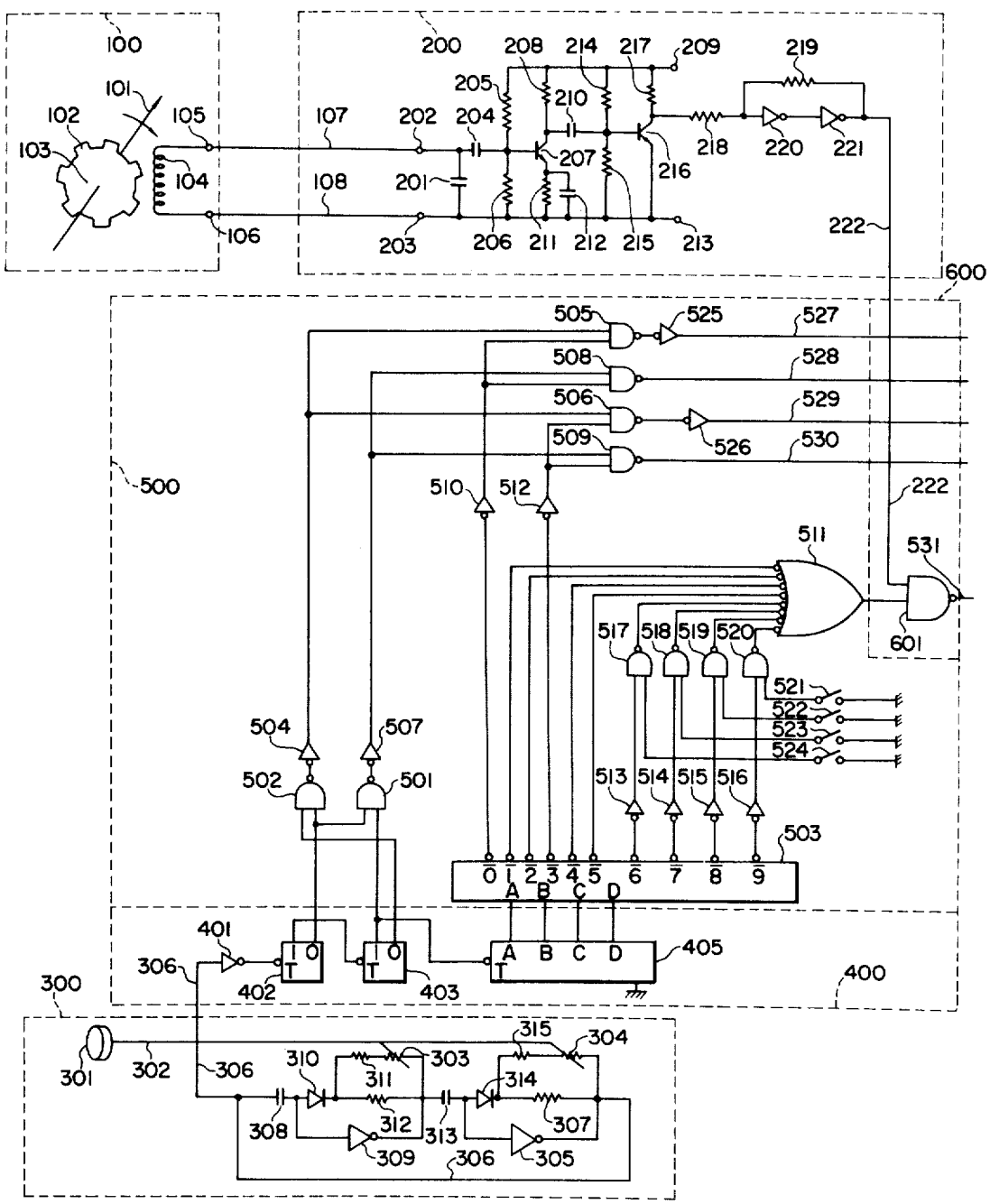
FIG. 2 is a circuit diagram showing further constitutional details of the speed detector, waveform shaping circuit, oscillator, counter, controlling decoder, and gate circuit of the system shown in FIG. 1.

The oscillator 300, FIG. 2, is provided with a manually turnable knob 301 adapted for fine adjustment of a set speed, the knob 301 being fixedly attached to a shaft 302 which is coupled to variable resistors 303 and 304. The output of a NAND element 305, from which the aforesaid "oscillation pulses" are generated, is connected to a resistance 307, the variable resistor 304, a capacitor 308, and the input of a NAND element 401 of the counter 400. The output of the capacitor 308 is connected to the inputs of both NAND element 309 and diode 310. This diode 310 is connected to the variable resistor 303 through a resistance 311 and to a resistance 312. The outputs of these variable resistor 303, resistance 312 and NAND element 309 are commonly connected to the input of a capacitor 313, the output of which is connected to a diode 314 and to the NAND element 305. The output of the diode 314 is connected to the variable resistor 304 through a resistance 315 and to the resistance 307.

If, in the oscillator 300 of the above described construction, an output voltage from the NAND element 305 is elevated from zero to 5 volts, this voltage is impressed to the input of the NAND element 309 through the capacitor 308, so that the NAND element 309 has its output voltage reduced to zero. The zero output voltage from the NAND element 309 affects the input of the NAND element 305 through the capacitor 313 in such a manner that its output voltage is kept elevated to 5 volts. On the other hand, the output voltage from the capacitor 308 is discharged to the output of the NAND element 309 through the diode 310 and further through the resistance 312 and through the resistance 311 and the variable resistor 303. The period of this discharge determines the duration (H level) of the oscillation pulses.

As the output voltage from the capacitor 308 is reduced by the discharge to less than 1.5 volts, the output voltage from the NAND element 309 is elevated from zero to 5 volts. The elevated output voltage affects the input of the NAND element 305 through the capacitor 313 so that its output voltage is now reduced from 5 to zero volt. The reduced output voltage from the NAND element 305, in its turn, affects the input voltage to the NAND element 309 through the capacitor 308 so that the output voltage from this NAND element 309 is kept elevated to 5 volts. The output voltage from the capacitor 313 is discharged to the output of the NAND element 305 through the diode 314 and further through the resistance 307 and through the resistance 315 and the variable resistor 304. By the period of this discharge, the duration (L level) of the oscillation pulses is determined.

As the output voltage from the capacitor 313 is reduced by the above discharge to less than 1.5 volts, the output voltage from the NAND element 303 is elevated from zero to 5 volts. This elevated voltage affects the input of the NAND element 309 through the capacitor 308 so that the output voltage therefrom is reduced from 5 volts to zero. In the meantime, that is, while the output voltage from the NAND element 309 is kept at 5 volts, the other NAND element 205 has its output voltage reduced to zero.

In this manner the oscillation pulses 306 are produced which have the predetermined H and L levels. The frequency of these oscillation pulses are adjustable by the manual turn of the knob 301, which results in variation in the resistances of the variable resistors 303 and 304 and hence in the discharge periods of the capacitors 308 and 313.

The oscillation pulses thus produced are supplied to the NAND element 401 of the counter 400, FIG. 2, the output of which is connected to a trigger input terminal T of a flip-flop 402, 1 output terminal of this flip-flop 402 is connected to a trigger input terminal T of another flip-flop 403, the 1 output terminal of which is connected to a NAND element 501 and to a trigger input terminal T of a decimal counter 405. The aforesaid flip-flops 402 and 403 combine to make up a counter having the number 4 as the radix. The flip-flop 402 has its 0 output terminal connected to NAND elements 501 and 502, while the other flip-flop 403 has its 0 output terminal connected only to the NAND element 502.

Output terminals A, B, C and D of the decimal counter 405 are connected to input terminals A, B, C and D of a decoder 503 of the controlling decoder 500, respectively. The NAND element 502 is connected to both NAND elements 505 and 506 through a NAND element 504, while the NAND element 501 is connected to both NAND elements 508 and 509 through a NAND element 507. A $\overline{0}$ output terminal of the aforesaid decoder 503 is connected to the NAND elements 505 and 508 through a NAND element 510. $\overline{1}$, $\overline{2}$, $\overline{4}$, and $\overline{5}$ output terminals of the decoder 503 are connected to the inputs of a NAND element 511, and the remaining $\overline{3}$ output terminal of the decoder is connected to the NAND elements 506 and 509 through a NAND element 512. Further, $\overline{6}$, $\overline{7}$, $\overline{8}$ and $\overline{9}$ output terminals of the decoder 503 are connected to NAND elements 517, 518, 519 and 520 through NAND elements 513, 514, 515 and 516, respectively.

Another input terminal of each of the NAND elements 517, 518, 519 and 520 are grounded through switches 521, 522, 523 and 524, respectively, while the output terminals of these NAND elements are connected to the inputs of the aforesaid NAND element 511. The NAND element 505 is further connected to a NAND element 525, and the NAND element 506 to a NAND element 526.

The register set signal 527 is produced from the NAND element 525, the subtraction counter set signal 528 from the NAND element 508, the speed setting register set signal 529 from the NAND element 526, the addition counter set signal 530 from the NAND element 509, and the addition-subtraction signal 531 from the NAND element 601.

Figure 13:
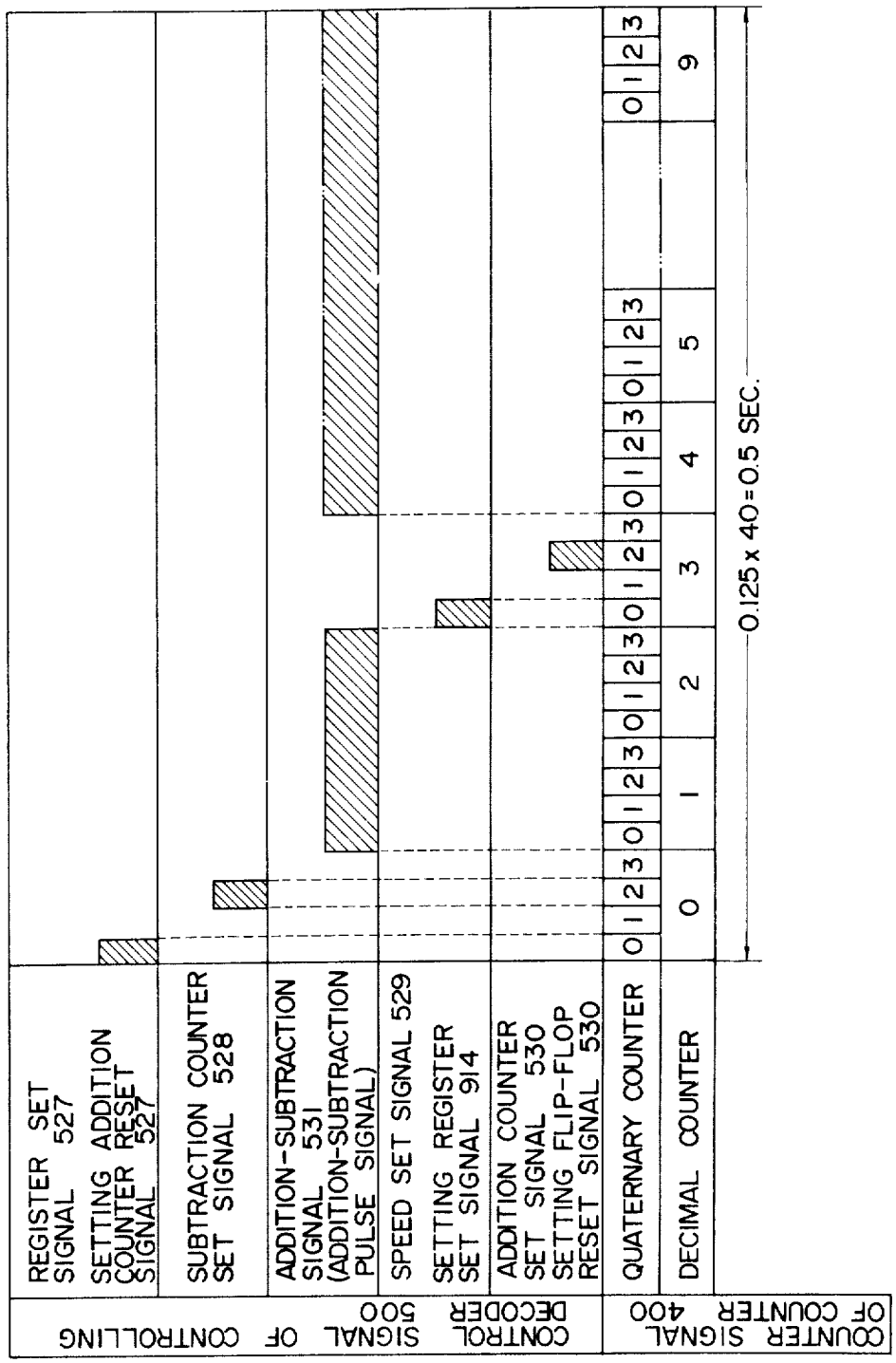
FIG. 13 is a diagram indicating the relationships of control signals of the controlling decoder with respect to quaternary and decimal counters.
Figure 14:
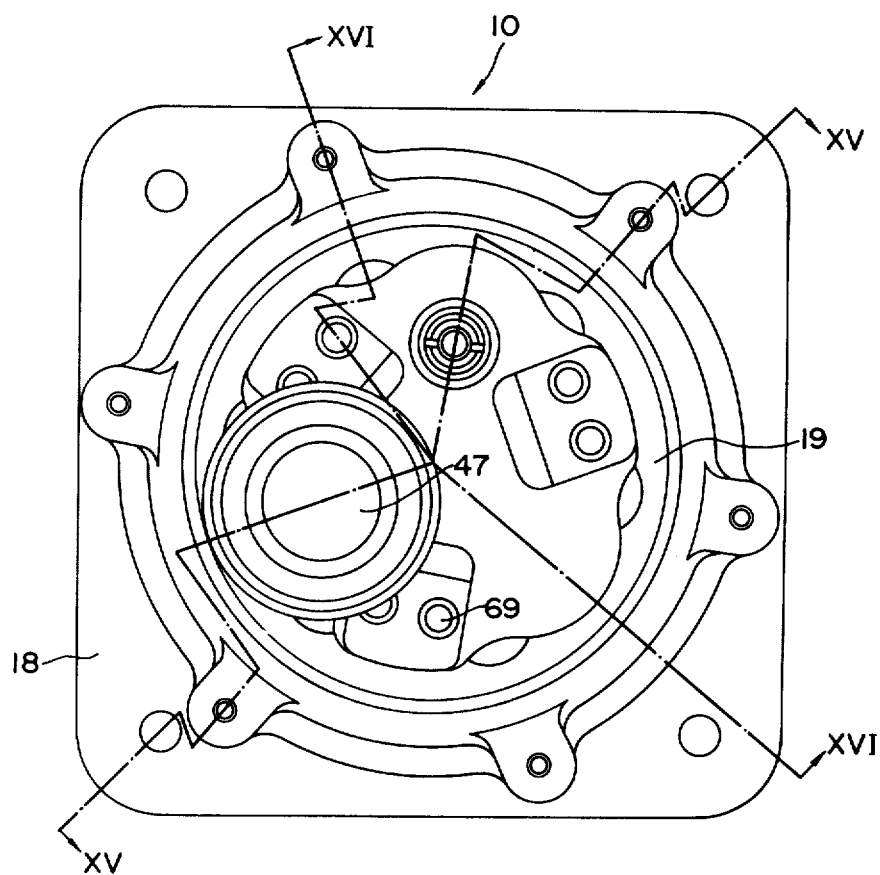
FIG. 14 is a front view of an example of an actuator suitable for use according to this invention.

In the controlling decoder 500 of the foregoing circuitry, the oscillation pulses 306 supplied from the oscillator 300 through the NAND element 401 are counted by the quaternary counter comprised of the flip-flops 402 and 403 and by the decimal counter 405. As shown in FIG. 13, these quaternary and decimal counters repeatedly count up to 40 of the oscillation pulses 306. Thus the output terminals of the decoder 503 serves the various functions seen in the drawing. The register set signal 527 is obtained in the AND condition where the output from the quaternary counter represents 0 and the output from the decimal counter $\bar{0}$. The subtraction counter set signal 528 is obtained in the AND condition where the output from the quaternary counter represents 2 and the output from the decimal counter $\bar{0}$. The speed setting register set signal 529 is obtained in the AND condition where the output from the quaternary counter represents 0 and the output from the decimal counter $\bar{3}$. The addition counter set signal 530 is obtained in the AND condition where the output from the quaternary counter represents 2 and the output from the decimal counter $\bar{3}$.

If the manual controls or switches 521, 522, 523 and 524 are all open, the addition-subtraction signal 531 is obtained when outputs from the decoder 502 are $\bar{1}, \bar{2}, \bar{4}, \bar{5}, \bar{6}, \bar{7}, \bar{8}$ and 9. When the switch 521 is closed, an output signal from the NAND element 520 always represents 1 and thus does not work as input to the NAND element 511, so that the addition-subtraction signal 531 is obtained when outputs from the decocer 503 are $\bar{1}, \bar{2}, \bar{4}, \bar{5}, \bar{6}, \bar{7}$ and $\bar{8}$. Similar results are obtained when the other switches 522, 523 and 524 are closed. Upon closure of the switch 522, for example, an output signal from the NAND element 519 represents 1 and no longer work as input to the NAND element 511, so that the output from the $\bar{8}$ output terminal of the decoder 503 is eliminated from the addition-subtraction signal 531. Hence the duration of the addition-subtraction signal 531 is regulatable as desired by the manual operation of the switches 521 to 524.

Referring now to FIG. 3 in order to describe the configuration of the command circuit 900 illustrated in the drawing in greater detail, the addition counter set signal (the setting flip-flop reset signal) 530 from the controlling decoder 500 is supplied to a NAND element 901. The speed setting register set signal 529 is supplied to a NAND element 902. A first input terminal of a NAND element 903 is grounded through an auto switch 904, which is normally kept open with a spring 905. One of the input terminals of a NAND element 906 is also grounded through the auto switch 904. A second input terminal of the NAND element 903 is grounded with a resume switch 907, which is normally kept open with a spring 908. One of the input terminals of a NAND element 909 is grounded through a stop switch 910, which also is normally kept open with a switch 911. An output terminal of this NAND element 909 is connected to a third input terminal of the NAND element 903, on the one hand, and is used, on the other hand, to send out an actuation-stop signal (command signal) 912. An output terminal of the NAND element 903 is connected to another input terminal of the NAND element 909. An output terminal of the NAND element 901 is connected to another input terminal of the NAND element 906, which has its output terminal connected to another input terminal of the NAND element 901 and to another input terminal of the NAND element 902. An output terminal of this NAND element 902 is connected to a NAND element 913 in order to supply a speed register set signal 914 therethrough.

Upon manual closure of the stop switch 910 in the command circuit 900 of the above described configuration, an output signal from the NAND element 909 attains the H level since the NAND elements 909 and 903 constitute an R-S flip-flop. The output from the NAND element 909 remains in the H level even after the stop switch 910 is opened. The actuation-stop signal produced from the NAND element 909 in this instance is a stop signal, being in the H level. As the auto switch 904 is manually closed, the actuation-stop signal produced from the NAND element 909 is an actuation signal, being in the L level, and the conditions of the NAND elements 906 and 909 are unchanged because the NAND elements 906 and 901 constitute an R-S flip-flop.

When the speed setting register set signal 529, in the H level, is applied to the NAND element 902 from the controlling decoder 500, an output signal from the NAND element 902 is in the L level, while the NAND element 913 produces the speed register set signal 914, which is in the H level. When the addition counter set signal (setting flip-flop reset signal) 530, in the L level, is applied to the NAND element 901, the NAND element 906 produces an output signal in the L level, while the NAND element 902 produces an output signal which is in the H level regardless of the condition of the speed setting register set signal 529. Thus the speed register set signal 914, produced from the NAND element 913, attains the L level and hence no longer performs its function.

Upon closure of the resume switch 907 after closing the stop switch 910 to make the actuation-stop signal 912 a stop signal in the H level, this actuation-stop signal 912 is turned into an actuation signal in the L level. However, the speed register set signal 914 remains in the L level, without being affected by the closure of the resume switch 907.

To describe now the configuration of the counting circuit 700 with reference to FIG. 3, the register set signal 527 from the aforementioned controlling decoder 500, FIG. 2, is supplied to a trigger terminal T of a register 705 comprising four flip-flops 701, 702, 703 and 704, to a trigger terminal T of a register 710 comprising four flip-flops 706, 707, 708 and 709, to a reset terminal R of a free-running counter 715 comprising four flip-flops 711, 712, 713 and 714, and to a reset terminal R of a free-running counter 720 comprising four flip-flops 716, 717, 718 and 719. The subtraction counter set signal 528 from the controlling decoder 500 is supplied to NAND elements 721 and 722. An output terminal of the NAND element 721 is connected to one of the two inputs of each of NAND elements 723 to 730, while an output terminal of the NAND element 722 is connected to one of the two inputs of each of NAND elements 731 to 738. An output terminal of the NAND element 731 is connected to a set terminal S of a flip-flop 739 and also to the other input terminal of the NAND element 723, an output terminal of which is connected to a reset terminal R of the flip-flop 739.

Similarly, the output terminals of the NAND elements 732 to 738 are connected to set terminals S of flip-flops 740 to 746, respectively, and to the other input terminals of the NAND elements 724 to 730, respectively. The output terminals of these NAND elements 724 to 730 are connected to reset terminals R of the flip-flops 740 to 746, respectively.

0 terminal of the flip-flop 739 is connected to T terminal of the flip-flop 740. In a similar manner, 0 terminal of each of the flip-flops 740 to 745 is connected to T terminal of the succeeding flip-flop. 1 terminals of the flip-flops 739 to 746 are connected to corresponding D terminals of the aforesaid registers 705 and 710.

The addition counter set signal 530 from the controlling decoder 500 is supplied to NAND elements 751 and 752. An output terminal of the NAND element 751 is connected to one of two input terminals of each of NAND elements 753 to 760, while an output terminal of the other NAND element 752 is connected to one of two input terminals of each of NAND elements 761 to 768. An output terminal of the NAND element 761 is connected to a set terminal S of a flip-flop 769. Similarly, output terminals of the NAND elements 762 to 768 are connected to set terminals S of flip-flops 770 to 776, respectively.

An output terminal of the NAND element 753 is connected to a reset terminal R of the flip-flop 769. Similarly, output terminals of the NAND elements 754 to 760 are connected to reset terminals R of the flip-flops 770 to 776, respectively. An output terminal of the NAND element 761 is connected to the other input terminal of the NAND element 753. Output terminals of the other NAND elements 762 to 768 are connected to the other input terminals of the NAND elements 754 to 760, respectively. 1 terminal of the flip-flop 769 is connected to T terminal of the succeeding flip-flop 770. In a similar manner, 1 terminal of each of the flip-flops 770 to 775 is connected to T terminal of the succeeding flip-flop. The 1 terminal of the flip-flop 769 is also connected to the other input terminal of the NAND element 731, and the 1 terminals of the other flip-flops 770 to 776 are similarly connected to the other input terminals of the NAND elements 732 to 738, respectively.

The addition-subtraction signal (addition-subtraction pulse signal) 531 from the controlling decoder 500 is supplied to a T terminal of the flip-flop 739, to a T terminal of the flip-flop 769, and to a T terminal of the counter 715. A D terminal of this counter 715 is connected to a T terminal of the counter 720. An A terminal of the counter 715 is connected to a D terminal of a flip-flop 777 which, together with flip-flops 778, 779 and 780, constitutes a register 781. B, C and D terminals of the counter 715 are similarly connected to corresponding D terminals of the register 781, and A, B, C and D terminals of the counter 720 are also similarly connected to corresponding D terminals of a register 786 comprising four flip-flops 782 to 785.

The speed register set signal 914 from the command circuit 900, FIG. 3, is supplied to T terminals of the registers 781 and 786. The other input terminal of the NAND element 761 is connected to a corresponding 1 terminal of the register 781, and the other input terminals of the NAND elements 762 to 768 are similarly connected to corresponding 1 terminals of the registers 781 and 786.

The operation of the counting circuit 700 of the foregoing configuration is hereinafter described. The addition counters 715 and 720 are zeroed by the register set signal (setting addition counter reset signal) 527, as indicated in FIG. 13. The succeedingly supplied addition-subtraction (pulse) signal 531 is counted by the counters 715 and 720. The number of pulses thus counted is stored in the registers 781 and 786 by the speed register set signal 914 from the command circuit 900. Hence the pulse number responsive to the vehicle speed is stored in the registers to represent a set speed. By the addition counter set signal 530, the mentioned pulse number in the registers 781 and 786 is further stored in the addition counter comprised of the flip-flops 769 to 776 through the NAND elements 761 to 768 and the NAND elements 753 and 760. The addition-subtraction signal 531 from the controlling decoder 500 is then counted by the aforesaid addition counter.

By the subtraction counter set signal 528 of the next cycle from the controlling decoder 500, the pulse number counted in the addition counter is stored in the subtraction counter comprised of the flip-flops 739 to 746 through the gate circuit comprised of the NAND elements 731 to 738 and of the NAND elements 723 to 730.

Then, the addition-subtraction(pulse) signal 531 from the controlling decoder 500 is subtracted in the subtraction counter. The pulse number obtained as a result of the subtraction is; $(A - B) + (C - D)$, which is a superposition of the pulse number $(C - D)$ corresponding to the differential value of the present vehicle speed on a difference between the pulse number A representative of the set speed and the pulse number B representative of the present speed. The pulse number obtained as a result of the substraction is stored in the register circuit comprised of the registers 705 and 710 by the register set signal 527 of the third cycle from the controlling decoder circuit 500. The pulse number $(A - B) + (C - D)$ is stored in the flip-flops 701 to 704 and 706 to 709 constituting the register circuits in the binary system of notation. In the circuit diagram of FIG. 3, the reference characters 787a to 792a respectively denote output signals from the 1 terminals of the flip-flops 703 to 704 and 706 to 709, and the reference characters 787b to 792b respectively denote output signals from the 0 terminals of the flip-flops.

Reference will now be made to FIG. 4 to describe the configuration of the decision decoder 800. The output signals 787b to 792b from the register circuits of the precedingly described counting circuit 700, FIG. 3, are supplied to input terminals of a NAND element 801. An output terminal of this NAND element 801 is connected to one of two input terminals of a NAND element 802, the other of which is connected the input terminal of the NAND element 801 to which the output signal 792b is supplied. The output signals 787a to 792a from the counting circuit 700 are supplied to input terminals of NAND element 803. An output terminal of this NAND element 803 is connected to one of two input terminals of a NAND element 804, the other of which is connected to the input terminal of the NAND element 803 to which the output signal 792a is supplied.

As shown in FIGS. 4 and 12, an acceleration signal 807 is obtained when the output signal from the NAND element 802 is in the L level, while a deceleration signal 810 is obtained when the output signal from the NAND element 804 is in the L level. As an electric current flows through a coil 805, a normally open contact pair 806 is closed to energize an accelerating electromagnetic valve 11 of the operation controller 10. Flow of an electric current through a coil 808 results in the opening of a normally closed contact pair 809 so that a decelerating electromagnetic valve 12 of the operation controller is de-energized.

The output signals 789b, 790b, 791b and 792b from the counting circuit 700 are also supplied to input terminals of a NAND element 811, while the output signals 789a, 790a, 791a and 792a are supplied to input terminals of a NAND element 812. Output terminals of these NAND elements 811 and 812 are connected respectively to input terminals of a NAND element 813, an output terminal of which is further connected to an input terminal of a NAND element 814. An adjusting signal 817 is obtained when the output signal from the NAND element 814 is in the L level, as shown in both FIGS. 4 and 12. As an electric current flows through a coil 815, a normally open contact pair 816 is closed to energize a reducing electromagnetic valve 13 of the operation controller 10. The operation of the decision decoder 800 is described in greater detail hereinbelow When the pulse number E obtained in the register of the counting circuit 700 is greater than, or equal to, +4, for example, the decision decoder 800 produces the acceleration signal 807. In other words, as will be understood from FIG. 12, this acceleration signal 807 is obtained on conditions that the output signal from the 1 terminal of the flip-flop 709 represents 0 and that the output signal from either one of the 1 teminals of the flip-flops 703 to 704 and 706 to 708 represents 1. The deceleration signal 810 is produced when the pulse number E is smaller than, or equal to −5. In other words, this deceleration signal is obtained on conditions that the output signal from the 1 terminal of the flip-flop 709 represents 1 and that the output signal from either one of the 1 terminals of the flip-flops 703 to 704 and 706 to 708 represents 0. The adjusting signal 817 is produced when −16 ≦ E ≦ +15. It will be readily understood that this adjusting signal is obtained when the output signals from the 1 terminals of all the flip-flops 706 to 709 represent 0 or when all these output signals represent 1.

A voltage regulating circuit 1000, FIG. 4, has its coil 1001 energized and its contact pairs 1002 and 1003 closed when the actuation stop signal (command signal) 912 of the command circuit 900 is in the L level. A power supply, not shown, capable of delivering a voltage of 12 volts, for example, is connected to a terminal 1004. Upon closure of the contact pair 1003, the voltage, indicated by numeral 1005, is supplied to the operation controller 10 hereinafter to be described in detail. As the contact pair 1002 is closed, a power supply capable of delivering a voltage of 5 volts is supplied to the coils 805, 808 and 815 of the decision decoder 800 as indicated by numeral 1006.

The aforesaid terminal 1004 is connected to a resistance 1007 and to collector terminals of transistors 1008 and 1009. An emitter terminal of the transistor 1009 is connected to a variable resistor 1010, a capacitor 1011, and a 5-volt power supply terminal 1012. The variable resistor 1010, a resistance 1013, and a base terminal of a transistor 1014 are interconnected at 1015. The resistance 1007, a base terminal of the transistor 1008, and a collector terminal of the transistor 1014 are interconnected at 1016. An emitter terminal of the transistor 1014 is connected to a grounding terminal 1018 through a zener diode 1017. This grounding terminal 1018 is also connected with the resistance 1013 and the capacitor 1011. An emitter terminal of the transistor 1008 is connected to a base terminal of the transistor 1009.

In the voltage-regulating circuit 1000 of the above described configuration, a voltage at the point of junction 1015 is elevated when a voltage at the 5-volt power supply terminal 1012 rises in excess of 5 volts. The resultantly elevated voltage at the base terminal of the transistor 1014 causes the same to permit the flow of a large amount of current. Due to the resultant voltage drop of the resistance 1007, therefore, the base current, and hence the emitter current, of the transistor 1008 decreases, resulting in the corresponding decrease in the base current of the transistor 1009. As a result, the emitter current of the transistor 1009 decreases, so that the voltage at the 5-volt power supply terminal 1012 is lowered. When the voltage at the 5-volt power supply terminal 1012 is lowered less than 5 volts, the reverse of the foregoing procedure takes place, with the result that the voltage at the terminal 1012 is elevated. By the repetition of the above described operations, a constantly regulated voltage of 5 volts is always obtained at the 5-volt power supply terminal 1012.

Figure 15:
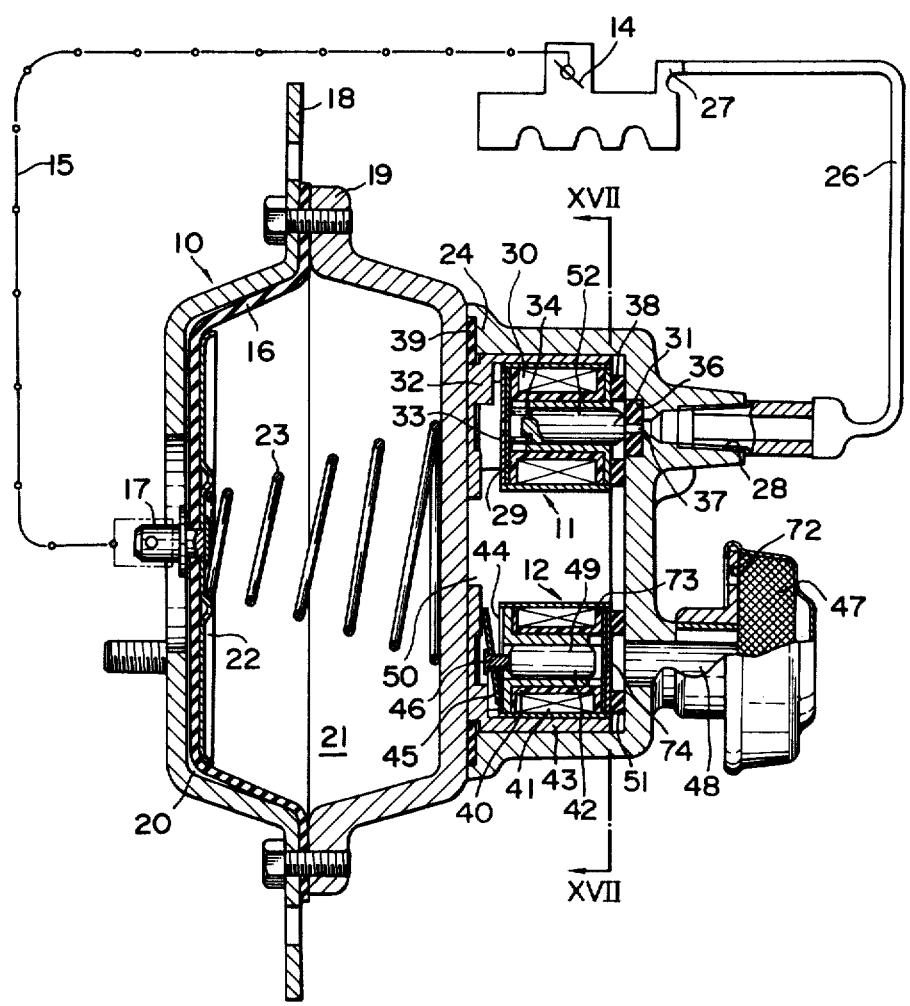
FIG. 15 is a sectional view taken along planes indicated by the broken line XV—XV in FIG. 14 as viewed in the arrow direction.
Figure 16:
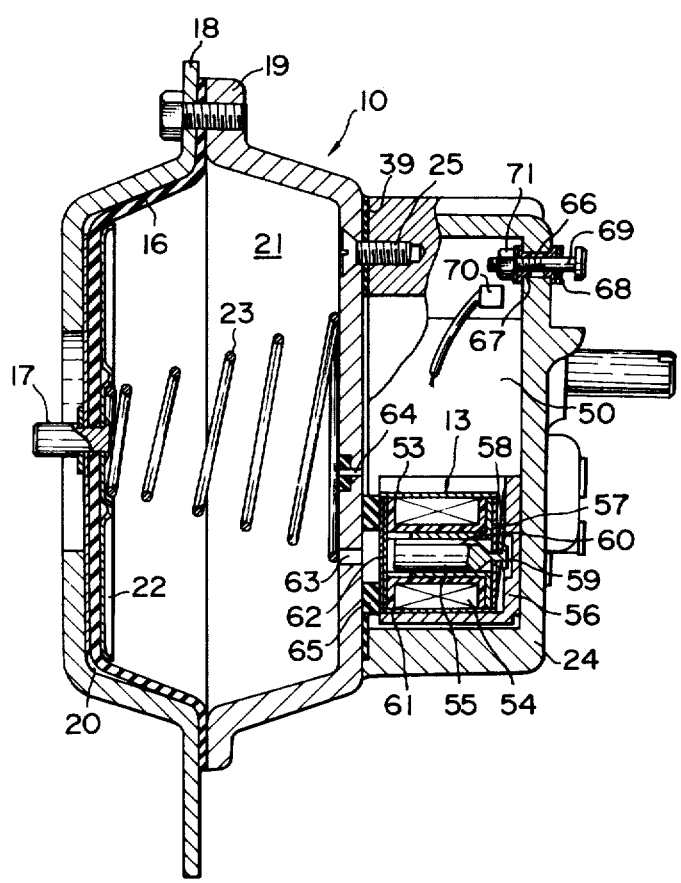
FIG. 16 is a sectional view, with a part cut away, taken along planes indicated by the broken line XVI—XVI in FIG. 14 as viewed in the arrow direction.
Figure 17:
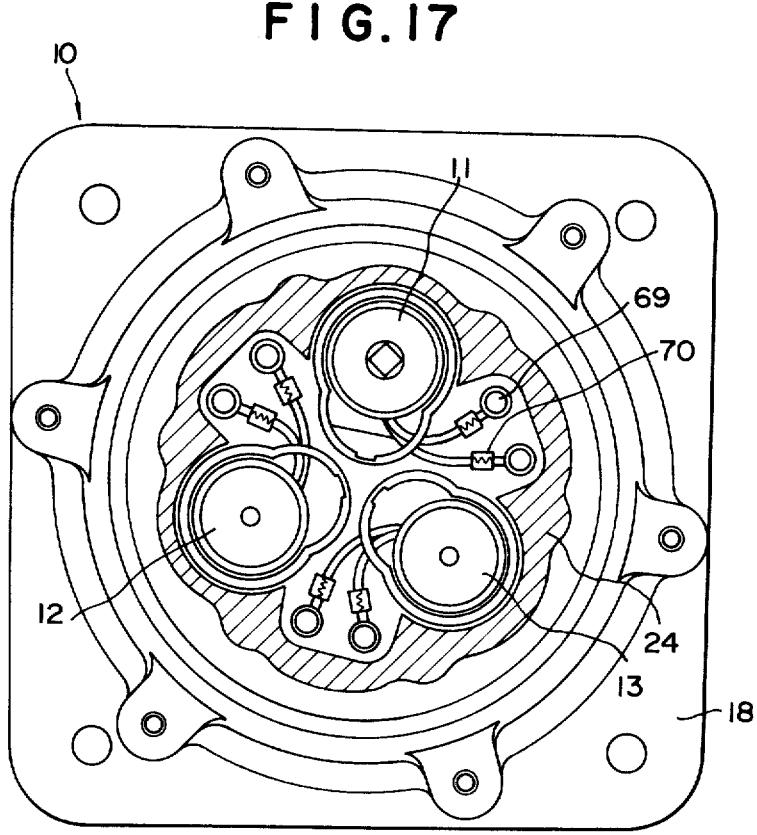
FIG. 17 is a sectional view taken along the plane indicated by line XVII—XVII in FIG. 15 as viewed in the arrow direction.
Figure 19:
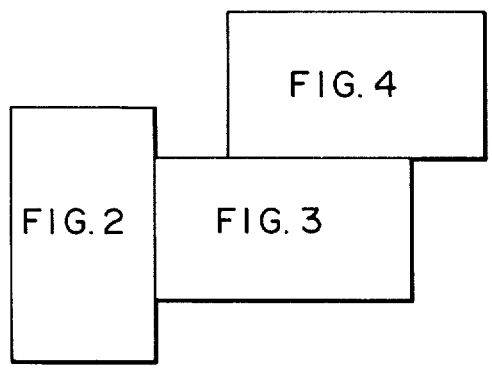
FIG. 19 is a diagram indicating the relationships between FIGS. 2, 3, and 4.

Described hereinbelow, with reference to FIGS. 14 to 17, are the details of the operation controller 10. A throttle valve 14, FIG. 15, within an engine carburetor is pivotally installed in accordance with the prior art and is pinned or otherwise coupled to a member 17 projecting from a diaphragm 16 through a chain 15. The peripheral edge of the diaphragm 16 is securely supported with a diaphragm case 19 and a plate member 18 suitable attached to a stationary part of the vehicle. The space defined by the plate member 18 and the case 19 is partitioned by the diaphragm 16 into two chambers 20 and 21, the chamber 20 being in open communication with atmosphere. A diaphragm holder 22 as well as the diaphragm 16 is pressed leftward, as viewed in FIG. 15, by a spring 23 installed between itself and the diaphragm case 19. An electromagnetic valve case 24, complete with a packing 39, is secured to the diaphragm case 19 by several screws 25 shown in FIG. 16, and is provided with a passageway 28 which communicates with an intake manifold 27 through a conduit system 26. Within the case 24 there are installed the accelerating electromagnetic valve 11, the decelerating electromagnetic valve 12, and the adjusting electromagnetic valve 13, as best shown in FIG. 17.

The accelerating electromagnetic valve 11 comprises a bobbin 29 of nonmagnetic material, a coil 30 wound on the bobbin 29, a plunger 31 axially slidable within the bobbin 29, and a spring 34 installed between the plunger 31 and a stop 33 secured to the case 24 through a spacer 32. The plunger 31 is pressed rightward, as viewed in FIG. 15, by the spring 34, so as to contact a rubber-made sealing member 36 and to close a bore 37 formed therethrough when the solenoid coil 30 is unenergized. As this coil 30 is energized, the plunger 31 moves leftward in FIG. 15 against the force of the spring 34 to communicate a chamber 50 within the case 24 with the intake manifold 27.

A cork-made sealing member 38 is installed between the accelerating electromagnetic valve 11 and the case 24. The decelerating electromagnetic valve 12 comprises a bobbin 40 of nonmagnetic material, a coil 41 wound on the bobbin 40, a plunger 42 axially slidable within the bobbin 40, and a leaf spring 45 between a spacer 43 secured to the case 24 and a thin plate member 44 secured to the bobbin 40. In engagement with a neck 46 of the plunger 42, the leaf spring 45 presses the plunger 42 leftward as seen in FIG. 15. Thus, when the electromagnetic solenoid coil 41 is unenergized, the chamber 50 is communicated with atmosphere through an air cleaner 47, a passageway 48, and a passageway 49 formed through the plunger 42. When the coil 41 is energized, the plunger 42 moves rightward in FIG. 15 against the force of the leaf spring 45 to close a bore 74 formed through a thin plate member 73 and hence to discommunicate the chamber 50 from atmosphere. A sealing member 51 is installed between the electromagnetic valve 12 and the case 24. A passageway 52 is formed through the plunger 31 of the aforesaid accelerating electromagnetic valve 11.

As best shown in FIG. 16, the adjusting valve 13 is comprised of a bobbin 53 of nonmagnetic material, an electromagnetic solenoid coil 54 wound on the bobbin 53, a plunger 55 axially slidable within the bobbin 53, and a leaf spring 58 between a spacer 56 secured to the case 24 and a thin plate member 57 secured to the bobbin 53. Engages with a neck 59 of the plunger 55, the leaf spring 58 presses the plunger 55 rightward as viewed in FIG. 16. Thus, when the electromagnetic solenoid coil 54 is unenergized, the aforesaid chamber 50 is communicated with the chamber 21 within the diaphragm case 19 through a passageway 60 formed in the plunger 55, a bore 62 formed through a valve seat 61, and a bore 63 formed through the diaphragm case 19. The chamber 50 is also in communication with the chamber 21 through an adjusting hole 64 (considerably smaller than the bore 63) formed through the diaphragm case 19. As the coil 54 is energized, the plunger 55 moves leftward in FIG. 16 against the force of the leaf spring 58 to close the bore 62 and hence to permit the communication of the chamber 50 and the chamber 21 only through the adjusting hole 64.

A sealing member 65 is installed between the diaphragm case 19 and the adjusting valve 13. For connecting the leads from the above described valves 11, 12 and 13 with external terminals, a pair of insulating collars 67 and 68 are fixed to a bore 66 of the case 24 from both sides. An external terminal inserted into the bore is connected with each terminal connector 70 by use of a nut 71.

The operation of the above constructed operation controller or actuator 100 is hereinafter described. As long as the vehicle is at rest, the power supply of the circuit is cut off upon depression of the brake pedal, clutch pedal or the like not only when the main switch (or ignition switch) is kept off but when the engine is ready for start-up. All the electromagnetic valves 11, 12 and 13 are then unoperative. The vacuum pressure from the intake manifold 27 is interrupted, and the atmosphereic air from the bore 72, FIG. 15, is admitted atmospheric the chamber 21 through the passageways 48 and 49, the chamber 50, the passageway 60, and the bores 62 and 63. Hence the diaphragm 16 is pressed leftward by the spring 23 as illustrated in FIGS. 15 and 16.

Accordingly, the throttle valve 14 operatively coupled to the diaphragm 16 through the chain 15, FIG. 15, is now fully closed. If the vehicle running at a constant speed is loaded to such a degree that its speed falls lower than a preset speed, and if the fall of the vehicle speed is such that the pulse number E computed by the counting circuit 700 is greater than, or at least equal to, +16 as seen in FIG. 12, the accelerating valve 11 and the decelerating valve 12 are energized by the decision decoder 800, while the adjusting valve 13 is unenergized, as demonstrated in FIG. 18. The admission of the atmospheric air is now cut off, and the vacuum pressure produced in the intake manifold 27 is introduced into the chamber 21 through the conduit 26, the passageways 28 and 52, the chamber 50, the passageway 60 of the plunger 55, the bore 62, and the bore 53 of the diaphragm case 19. The resultantly produced difference between the pressures on both sides of the diaphragm 16 causes the same to move rightward, as viewed in FIGS. 15 and 16, against the force of the spring 23. By this rightward movement of the diaphragm 16, the chain 15 coupled therewith is pulled so that the throttle valve 14 is opened.

When the drop of the vehicle speed is so small that the pulse number E computed in the counting circuit 700 is in the relation, $+4 \leq E \leq +15$, in FIG. 12, then all the valves 11, 12 and 13 are energized as seen in FIG. 18, so that the chamber 50 is discommunicated from atmosphere as the vacuum pressure is introduced into the chamber 50 from the intake manifold 27. Further, as the adjusting valve 13 is energized, the communication of the chamber 50 with the chamber 21 through the bore 63 is interrupted. Thus these chambers are now intercommunicated only through the adjusting hole 64, so that the vacuum pressure admitted into the chamber 21 is narrowly limited. As a difference is gradually produced between the pressures on both sides of the diaphragm 16, the throttle valve 14 is opened equally slowly.

If the vehicle which has been running at a constant speed picks up its speed in excess of a preset speed as it starts going downhill, and if the rise of the vehicle speed is so great that the pulse number E computed in the counting circuit 700 is smaller than, or equal to, −17 in connection with FIG. 12, then all the valves 11, 12 and 13 shown in FIGS. 15 and 16 are unenergized by the decision decoder 800 as seen in FIG. 18. The vacuum pressure is now cut off, while the atmospheric pressure is admitted into the chamber 50 and hence into the chamber 21 through the passageway 60 of the plunger 55 and the bores 62 and 63 and also through the hole 64, thereby rapidly closing the throttle valve 14.

In event the rise of the vehicle speed is so small that the pulse number E is in the relation, $-16 \leq E \leq -5$, in FIG. 12, then the accelerating valve 11 and the decelerating valve 12 are unenergized while only the adjusting valve 13 is energized as in FIG. 18. The vacuum pressure is cut off, and the atmospheric pressure is introduced into the chamber 50 and hence into the chamber 21 only through the adjusting hole 64. The chambers on both sides of the diaphragm 16 gradually attains the same pressure, so that the throttle valve 14 is equally slowly closed.

When there exists a small difference between the vehicle speed and a preset speed, that is, when the pulse number E counted in the counting circuit 700 is in the relation $-4 \leq E \leq +3$, in FIG. 12, then the accelerating valve 11 is unenergized while the decelerating valve 12 and the adjusting valve 13 are both energized, as may be apparent from FIG. 18. Both the vacuum pressure and the atmospheric pressure are now cut off, and the chambers 50 and 21 are intercommunicated only through the adjusting hole 64, with the result that the diaphragm 16 remains substantially unactuated. No substantial change is therefore caused in the vehicle speed.

The overall operation of the present embodiment of the invention is described hereinbelow. In order to run the vehicle at a constant speed, the driver or operator is required to give a temporary pressure to the auto switch 904, FIG. 3, thereby to cause the NAND element 906, which constitutes a flip-flop, to attain the H level and hence to make the NAND element 902 ready for the delivery of the setting register set signal 914 upon supply of the speed set singal 529. The NAND element 909 which constitutes a flip-flop is thus made to attain the L level. The coil 1001, FIG. 4, now carries a current, and the supply voltage is impressed to the coils 805, 808 and 815, to the solenoid coil 30 of the accelerating valve 11, to the solenoid coil 41 of the decelerating valve 12, and to the solenoid coil 54 of the adjusting valve 13 (refer to FIGS. 15 and 16). In this manner the operation controller 10 is rendered operative.

With reference to FIG. 2, if the speed detector 100 detects a signal having a frequency of 10 cycles per second, for example, while the vehicle is running at a speed of 1 kilometer per hour, this signal is processed into the wheel pulse signal 222 of the mentioned frequency through the waveform shaping circuit 200. The oscillator 300 produces the oscillation pulse signal 306 having a period of 0.0125 second, i.e., a frequency of 80 cycles per second. The counter 400 periodically counts up to 40 of the pulses supplied. Accordingly, as may be understood from FIG. 13, the controlling decoder 500 periodically delivers a control signal at every 0.5 second since $0.0125 \times 40 = 0.5$.

Figure 20:
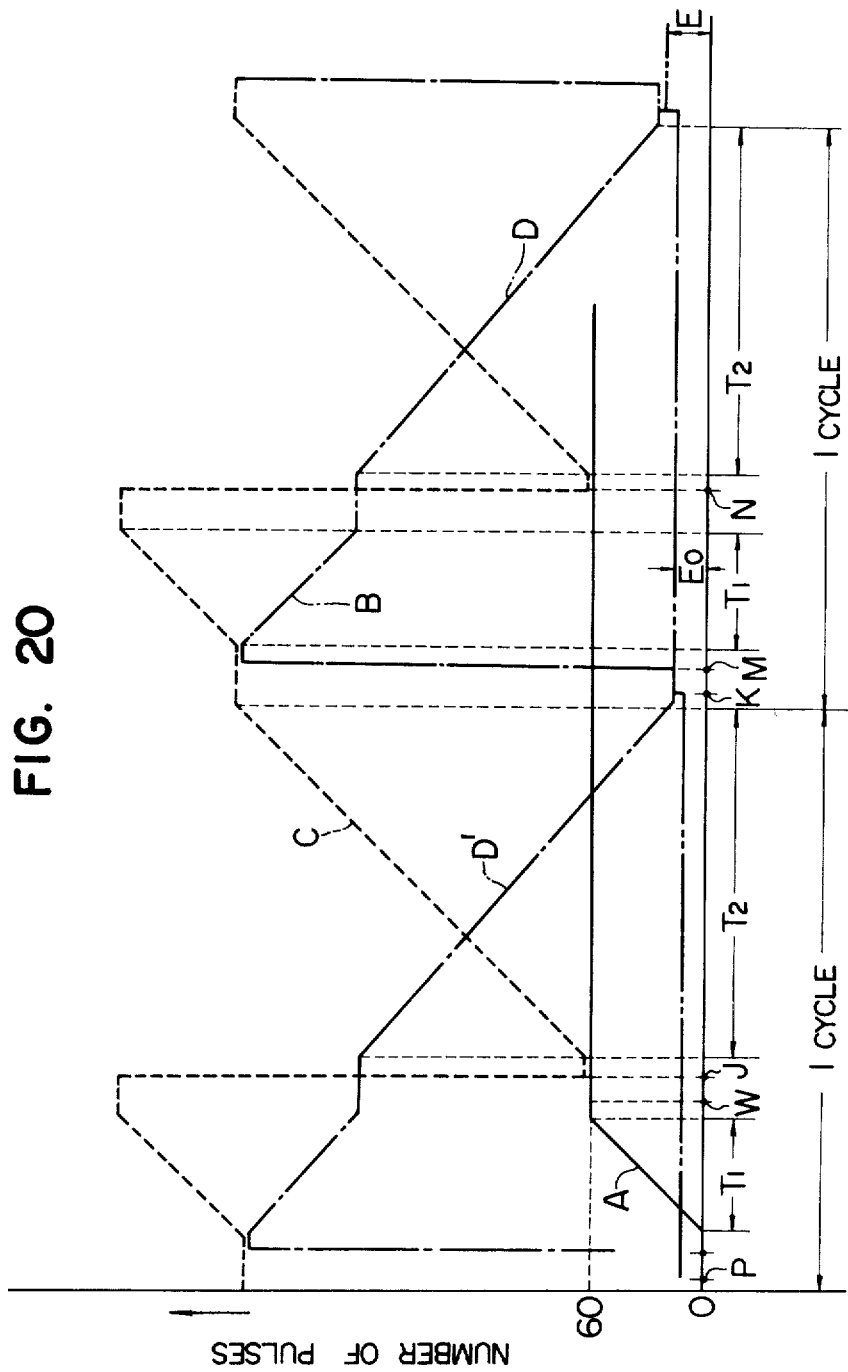
FIG. 20 is a graphical representation for a description of the computation operation according to the invention.

As is also apparent from FIG. 13, the flip-flops of the setting addition counters 715 and 720 of the counting circuit 700, FIG. 3, are set at zero by the setting addition counter reset signal 527 (represented by P in FIG. 20). The addition-subtraction pulse signal is now counted which has a time duration $T_1$ that is equal to 0.1 second since $8 \times 0.0125 = 0.1$. While the vehicle is running at a speed of, say, 60 kilometers per hour, the pulse number A corresponding to the set speed is 60, as seen in FIG. 20, since $600 \times 0.1 = 60$.

As the speed set signal 529 is delivered by the controlling decoder 500, this signal is turned into the setting register set signal 914 (represented by W in FIG. 20) through the NAND elements 902 and 913, FIG. 3. The pulse number A is now stored in the speed setting registers 781 and 786, FIG. 3. Since the NAND element 906, FIG. 3, is caused to attain the L level by the setting flip-flop reset signal 530, the setting register set signal 914 is no longer produced even when the speed set signal 529 is succeedingly produced, so that the pulse number A corresponding to the set speed is retained. Simultaneously, the set speed gate, FIG. 1, comprised of the NAND elements 753 to 768 is opened by the addition counter set signal (setting flip-flop reset signal) 530, and the pulse number A equal to 60 previously stored in the speed setting registers is registeres in the addition counter constituted of the flip-flops 769 to 776 (refer to J in FIG. 20).

Succeedingly, the addition-subtraction pulse signal 531 of a time duration $T_2$ which in this instance represents 0.3 second since $0.0125 \times 24 = 0.3$, is counted in the aforesaid addition counter to give the pulse number C. The addition-subtraction pulse signal 531 of the time duration $T_2$ or 0.3 second, on the other hand, is subtracted in the subtraction counter constituted of the flip-flops 739 to 746, FIG. 3 (refer also to D' in FIG. 20).

As described hereinbefore, the counter 400 is returned to zero at the end of its one complete cycle, while the pulse number $E_0$ computed by the aforesaid subtraction counter is stored in the registers respectively constituted of the flip-flops 701 to 704 and the flip-flops 705 to 709 by the register set signal 527 produced by the controlling decoder 500 (see K in FIG. 20).

By the subtraction counter set signal 528 of the controlling decoder 500, the subtraction gate constituted of the flip-flops 723 to 738, FIG. 3, is opened (see M in FIG. 20), and the pulse number (A + C) provided by the addition counter is registered in the subtraction counter. The addition-subtraction pulse signal 531 is subtracted (B + D) for a time $(T_1 + T_2)$, or for 0.4 second, since $0.1 + 0.3 = 0.4$. The pulse number E is thus obtained. During the progress of this subtraction, that is, at N in FIG. 20, the aforesaid set speed pulse number A is registered in the addition counter.

If the present speed of the vehicle is considerably higher than the set speed so that the pulse number E obtained as a result of the foregoing computations, which is in the relation, $E = A - B + C - D$, proves to be $-18$, for example, then the 1 output terminals of the flip-flops 701 to 704 and 706 to 709 in FIG. 3 produce signals respectively representative of 0, 1, 1, 1, 0, 1, 1 and 1, as is apparent from FIG. 12. If now it is assumed that the signals from the 1 output terminals of the flip-flops 701 to 704 and 706 to 709 are F1, F2, F3, F4, F6, F7, F8 and F9, then the signals from their 0 output terminals are $\overline{F1}, \overline{F2}, \overline{F3}, \overline{F4}, \overline{F6}, \overline{F7}, \overline{F8}$ and $\overline{F9}$. Hence the accelerating signal 807, the decelerating signal 810 and the adjusting signal 817, FIG. 4, are respectively represented by the following logical formulas:

Accelerating signal $= \overline{F3 \cdot F4 \cdot F6 \cdot F7 \cdot F8 \cdot F9} \cdot F9$
Decelerating signal $= \overline{F3 \cdot F4 \cdot F6 \cdot F7 \cdot F8 \cdot F9} \cdot F9$
Adjusting signal $= \overline{F6 \cdot F7 \cdot F8 \cdot F9} \cdot \overline{F6 \cdot F7 \cdot F8 \cdot F9}$ It will accordingly to be understood that the accelerating signal 807 is in the H level, the decelerating signal 810 in the L level, and the adjusting signal 817 in the H level. Thus an electric current does not flow through the coils 805 to 815 but only through the coil 808. All the switches 806, 809 and 816 are opened, so that the valves 11, 12 and 13 within the operation controller 10 are rendered inoperative. The vacuum pressure from the intake manifold 27 is cut off, whereas the atmospheric pressure from the air cleaner 47 is admitted into the chamber 50 and thence into the chamber 21 through the bores 63 and 64. As a result, the difference between the pressures on both sides of the diaphragm 16 is rapidly decreased, so that the diaphragm moves leftward in FIG. 15 or 16, it being pressed in that direction by the spring 23. The throttle valve 14 thus closed through the chain 15 rapidly lowers the vehicle speed.

If the present speed of the vehicle is only slightly higher than the set speed so that the pulse number E represents −10, for example, then the output signals from the flip-flops 701 to 704 and 706 to 709, FIG. 3, respectively represent 0, 1, 1, 1, 1, 1, 1 and 1, as seen in FIG. 12. Since, from the foregoing logical formulas, the accelerating signal 807 is in the H level, the decelerating signal 810 in the H level, and the adjusting signal 817 in the L level, an electric current flows neither through the coil 805 nor the coil 808 but only through the coil 815. The switch 806 is now opened, whereas the switches 809 and 816 are closed, so that the accelerating valve 11 is rendered inoperative while the decelerating valve 12 and the adjusting valve 13 are made operative. The vacuum pressure from the intake manifold 27 and the atmospheric pressure from the air cleaner 47 are both cut off, and the adjusting hole 63 is closed by the end face of the plunger 55 of the valve 13. The diaphragm 16 is kept unmoved, thereby causing no change in the vehicle speed.

If the vehicle speed drops considerably below the set speed so that the pulse number E represents +17, for example, the output signals from the flip-flops 701 to 704 and 706 to 709 respectively represent 1, 0, 0, 0, 1, 0, 0 and 0, as will be apparent from FIG. 12. From the previously defined logical formulas, the accelerating signal 807 is in the L level, the decelerating signal 810 in the H level, and the adjusting signal 817 in the H level, so that an electric current flows through the coil 805 but not through the coil 808 or 815. Since the switches 806 and 809 are closed and the switch 816 opened, the accelerating valve 11 and the decelerating valve 12 are rendered operative and the adjusting valve 13 inoperative. The atmospheric pressure from the air cleaner 47 is cut off, but the vacuum pressure from the intake manifold 27 is introduced into the chamber 50 through the conduit 26, the passageway 52 of the plunger 31, and so forth. The bore 63 is kept open. As a consequence, the vacuum pressure within the chamber 50 is admitted into the chamber 21 through the bores 63 and 64, thereby rapidly moving the diaphragm 16 rightward, as viewed in FIG. 15 or 16, against the force of the spring 23 and hance rapidly opening the throttle valve 14 through the chain 15. In this manner the vehicle speed makes a rapid recovery to the previously set level.

In case the vehicle speed is only slightly lower than the set speed so that the pulse number E represent +9, for example, the output signals from the flip-flops 701 to 704 and 706 to 709 respectively represent 1, 0, 0, 0, 1, 0, 0 and 0 as in FIG. 12. Since, from the foregoing logical formulas, the accelerating signal 807 is in the L level, the decelerating signal 810 in the H level, and the adjusting signal 817 in the L level, an electric current flows through the coils 805 and 815 but not through the coil 808. The switches 806, 809 and 816 are thus all closed, so that the three valves within the operation controller 10 are now all operative. While the atmospheric pressure from the air cleaner 47 is cut off, the vacuum pressure from the intake manifold 27 is introduced into the chamber 50 through the conduit 26 and the passageway 52 of the plunger 31. Since the bore 63 is closed by the end face of the plunger 55, the vacuum pressure within the chamber 50 is admitted into the chamber 21 through the hole 64 only, so that the resultant rightward movement, in FIG. 15 or 16, of the diaphragm 16 gradually takes place. The throttle valve 14 is slowly increased, and the vehicle speed is also slowly augmented.

As the operator closes the stop switch 911 of FIG. 3, which may be interlocked with the brake or clutch pedal in a known manner, the NAND element 909 constituting a flip-flop attains the H level. No electric current now flows through the coil 1001, and the supply voltage of the electromagnetic solenoids of the operation controller 10 is cut off, so that the operation controller 10 is rendered completely inoperative while the throttle valve 14 is closed.

When the operator succeedingly closes the resume switch 907, FIG. 3, the NAND element 909 constituting a flip-flop attains the L level, so that an electric current is again permitted to flow through the coil 1001 to resume the operation of the controller 10. Since the previously set vehicle speed is unmodified in this instance, the vehicle runs at the set speed.

Figure 21:
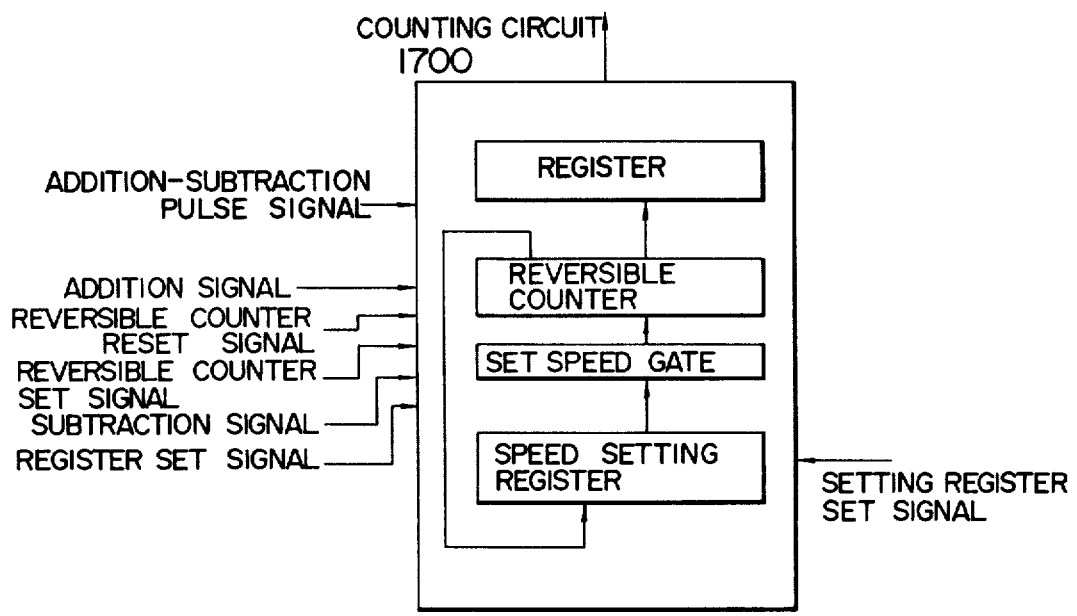
FIG. 21 is a block diagram showing another example of a counting circuit according to the invention.

Another example of the counting circuit of the present invention is schematically represented in FIG. 21, in which the modified counting circuit 1700 counts the pulse number E by the combination of a speed setting register, a set speed gate, a reversible counter, and a register, as hereinafter described in greater detail. An addition signal is first fed into the reversible counter so that it operates as an addition counter. Then, after succeedingly resetting the reversible counter to zero by a reversible counter reset signal, the pulse number A corresponding to a set speed is counted by an addition-subtraction pulse signal of a time duration $T_1$, as shown in FIG. 5. As long as an auto signal is produced from the auto switch by the operator, a setting register set signal is succeedingly produced, so that the pulse number A of the reversible counter is stored in the speed setting register.

Thereafter the reversible counter is zeroed by the reversible counter reset signal, and after succeedingly opening the set speed gate by a reversible counter set signal, the pulse number A of the speed setting register is set in the reversible counter. As the pulse number C is additively obtained by an addition-subtraction pulse signal of a time duration $T_2$, the pulse number (C − D) is produced in the reversible counter. Although the addition signal has been supplied to the reversible counter, a subtraction signal is now fed thereinto so that the same operates as a subtraction counter. The pulse number (B + D) is subtracted by an addition-subtraction pulse signal of a time duration($T_1 + T_2$), and there is obtained in the reversible counter the desired pulse number E which is in the relation, E = A + C − B − D. This pulse number E is stored in the register by a register set signal and is further fed into the decision dedocer 800 as in the first embodiment of the present invention illustrated in FIG. 1. The counting circuit 1700 of this second embodiment repeats the foregoing cycle of operation. It will be needless to say that a controlling decoder used in combination with the counting circuit 1700 must be modified correspondingly.

Although, in the precedingly described first embodiment of the invention, the pulse number corresponding to a set speed is counted in setting addition counter and is recorded in the speed setting register, it is also possible, without departing from the scope of the present invention, to record the pulse number in the speed setting register (or the setting addition counters 715 and 720 in FIG. 3)) through a coder which, under the manual control of the operator, translates the pulse number into a binary-coded setting pulse signal.

It will also be understood that, in the counting circuit 700 shown in FIG. 1, the setting addition counter isi eliminable, its function being performable by the addition counter.

Further, the relays used in the decision recoder and other components of the present invention may be substituted with transistors, integrated circuits or the like without affecting the functions of such components.

All such modifications, substitutions and changes are intended in the foregoing disclosure. It is therefore appropriate that the appended claims be construed broadly and in a manner consistent with the spirit and scope of the invention herein disclosed.

We claim:

1. A method of constantly adjusting the speed of a motor vehicle to a set speed, which comprises sensing the rotational state of the wheels of the motor vehicle to provide an electric signal representative of its speed, translating said signal into pulses of desired characteristics, counting said pulses as dictated by control signals to obtain a pulse number representing a set speed of the motor vehicle and pulse numbers representing its actual speed at specified instants, said control signals being produced from clock pulses of a predetermined frequency, further counting a pulse number substantially representing the sum of a difference between the set speed and the actual speed of the motor vehicle and a rate of change in the actual speed, and adjusting the speed of the motor vehicle according to the pulse number representing the sum.

2. A system for constantly adjusting the speed of a motor vehicle to a set speed, comprising means for sensing the rotational state of the wheels of the motor vehicle, a shaping circuit for translating an output signal from said sensing means into pulses of desired characteristics, a control circuit for producing control signals from clock pulses of a predetermined frequency, manually operable means for setting a speed at which the motor vehicle is desired to run constantly, a counting circuit for counting the output pulses from said shaping circuit as dictated by said control signals to obtain a pulse number in binary notation which represents a set speed of the motor vehicle and pulse numbers representing its actual speed at specified instants and for further counting a pulse number in binary notation substantially representing the sum of a difference between the set speed and the actual speed of the motor vehicle and a rate of change in its actual speed, a decision circuit for deciding an operation required on the basis of the final pulse number obtained in said counting circuit, and operation controller means for adjusting the speed of the motor vehicle according to an output signal from said decision circuit.

3. The system according to claim 2, wherein said control circuit comprises a clock-pulse oscillator, a free-running counter, and a decoder.

4. The system according to claim 2, wherein said pulse number substantially representing the sum of a difference between the set speed and the actual speed of the motor vehicle and a rate of change in the actual speed is obtained by first counting the output pulses from said shaping circuit for a first specified time to obtain a first pulse number representing the set speed, by subtracting from said first pulse number a second pulse number obtained by counting said output pulses for another first specified time, by adding to the difference between the first and the second pulse number a third pulse number obtained by succeedingly counting said output pulses for a second specified time, and by subtracting from the sum a fourth pulse number obtained by further succeedingly counting said output pulses for another second specified time.

5. The system according to claim 2, wherein said pulse number substantially representing the sum of a difference between the set speed and the actual speed of the motor vehicle and a rate of change in the actual speed is obtained by first counting the output pulses from said shaping circuit for a first specified time to obtain a first pulse number representing the set speed, by adding to said first pulse number a second pulse number obtained by counting said output pulses for a second specified time, and by subtracting from the sum of said first and said second pulse number of a third pulse number obtained by succeedingly counting said output pulses for the sum of said first and said second specified time.

6. The system according to claim 2, wherein at least two cycles of computing said pulse number substantially representing the sum of a difference between the set speed and the actual speed of the motor vehicle and a rate of change in the actual speed are carried out substantially simultaneously in said counting circuit.

7. The system according to claim 5, further comprising a circuit whereby at least one of said first and said second specified time is manually variable.

8. The system according to claim 2, further comprising means for manually varying the frequency of said clock pulses for fine adjustment of a set speed of the motor vehicle.

9. The system according to claim 2, further comprising a gate circuit connected between said shaping circuit and said counting circuit so as to be supplied with both the output pulses from said shaping circuit and a control signal from said control circuit.

10. The system according to claim 2, wherein said operation controller means comprises an accelerating electromagnetic valve, a decelerating electromagnetic valve, an adjusting electromagnetic valve, diaphragm means operated by said three electromagnetic valves, and an engine throttle valve operatively connected to said diaphragm means.

* * * * *